(12) United States Patent
Jenett et al.

(10) Patent No.: US 12,011,857 B2
(45) Date of Patent: *Jun. 18, 2024

(54) CUBOCTAHEDRON LATTICE MATERIALS

(71) Applicants: Massachusetts Institute of Technology, Cambridge, MA (US); United States Government as Represented by The Administrator of NASA, Washington, DC (US)

(72) Inventors: Benjamin Jenett, Cambridge, MA (US); Neil Gershenfeld, Cambridge, MA (US); Kenneth Cheung, Emerald Hills, CA (US); Christine Gregg, Emerald Hills, CA (US)

(73) Assignees: UNITED STATES OF AMERICA AS REPRESENTED BY THE ADMINISTRATOR OF NASA, Washington, DC (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,136

(22) Filed: Nov. 14, 2022

(65) Prior Publication Data

US 2023/0211528 A1 Jul. 6, 2023

Related U.S. Application Data

(63) Continuation of application No. 16/952,896, filed on Nov. 19, 2020, now Pat. No. 11,498,250.

(60) Provisional application No. 62/937,609, filed on Nov. 19, 2019.

(51) Int. Cl.
| | |
|---|---|
| *B29C 45/00* | (2006.01) |
| *B29C 65/00* | (2006.01) |
| *B29C 65/02* | (2006.01) |
| *B29C 65/48* | (2006.01) |
| *B29C 65/60* | (2006.01) |
| B29C 45/26 | (2006.01) |
| B29K 105/04 | (2006.01) |
| B29K 307/04 | (2006.01) |
| B29K 309/08 | (2006.01) |

(52) U.S. Cl.
CPC ........ *B29C 45/006* (2013.01); *B29C 45/0001* (2013.01); *B29C 45/0005* (2013.01); *B29C 45/0017* (2013.01); *B29C 65/02* (2013.01); *B29C 65/48* (2013.01); *B29C 65/60* (2013.01); *B29C 66/7254* (2013.01); *B29C 2045/0022* (2013.01); *B29C 2045/0067* (2013.01); *B29C 45/26* (2013.01); *B29C 2045/2683* (2013.01); *B29K 2105/04* (2013.01); *B29K 2307/04* (2013.01); *B29K 2309/08* (2013.01); *B29K 2995/0094* (2013.01)

(58) Field of Classification Search
None
See application file for complete search history.

*Primary Examiner* — Jacob T Minskey
*Assistant Examiner* — Adrianna N Konves
(74) *Attorney, Agent, or Firm* — Dunlap Bennett & Ludwig, PLLC

(57) ABSTRACT

A method for the design, manufacture, and assembly of modular lattice structures composed of cuboctahedron unit cells.

16 Claims, 30 Drawing Sheets

Side

Isometric

CUBOCTAHEDRON LATTICE MATERIALS

This application is a continuation of U.S. Nonprovisional application Ser. No. 16/952,896, filed Nov. 19, 2020, now U.S. Pat. No. 11,498,250; which is related to, and claims priority to, U.S. Provisional Application No. 62/937,609, filed Nov. 19, 2019. The '896 and '609 applications are hereby incorporated by reference in their entirety.

This invention was made with Government support under contract number 80NSSC19M0039 awarded by NASA. The Government has certain rights in the invention.

BACKGROUND

Field of the Invention

The present invention relates to construction of light weight structures, and more particularly to the discrete assembly of structures made of lattice materials.

Description of the Problem Solved

There is a need for light weight structures that are strong enough to be used in aeronautical and aerospace construction. Structures that include lattices of cellular materials meet this demand. Mechanical cellular metamaterials offer novel properties based on local control of cell geometry and their global configuration into structures and mechanisms. Historically, these have been made as continuous, monolithic structures with additive manufacturing, which affords high resolution and throughput, but is inherently limited by process and machine constraints.

The theory of cellular materials was established in seminal work by Gibson and Ashby [1]. Preliminary additive manufacturing of high-performance lattice materials was published by Shaedler et al. [2]. Further work was established by Zheng et al. [3]. Alternative methods for lattice manufacturing based on discrete assembly was established by Cheung and Gershenfeld [4], while the introduction of injection molded versions was published by Cheung and Gregg [5]. Applications include morphing aerostructures at various scales [6][7], and reconfigurable large-scale infrastructure [8]. Methods for robotic assembly have been presented by Jenett et al [9].

SUMMARY OF THE INVENTION

The present invention relates to a construction system for mechanical metamaterials based on discrete assembly of a finite set of parts, which can be spatially composed for a range of properties such as rigidity, compliance, chirality, and auxetic behavior. This system achieves desired continuum properties through design of the parts such that global behavior is governed by local mechanisms. Design methodology, production process, numerical modeling, and experimental characterization of metamaterial behaviors are descried. This approach benefits from incremental assembly which eliminates scale limitations, best-practice manufacturing for reliable, low-cost part production, and interchangeability through a consistent assembly process across part types.

The present invention relates particularly to cuboctahedral lattice geometry (FIGS. 1A-1E), which can be decomposed into face connected cuboctahedron. The material used is informed by the manufacturing process, which is injection molding. This limits material selection to moldable materials, but still offers several high-performance options such as glass fiber and carbon fiber reinforced polymer (GFRP, CFRP). The size of the lattice can vary based on the application. As an example, a version with a 75 mm lattice pitch will be used.

The decomposition of the cuboctahedron unit cell is shown in FIGS. 2A-2C. In contrast to prior art (Cheung/Gregg), the objective is to reduce mold complexity, and thus cost, by molding individual faces which then are assembled into the voxel building block (Shown in FIGS. 3A-3C). This assembly can be achieved with a number of methods, including permanent methods such as welding or gluing, and reversible methods such as bolting or riveting. Blind rivets are used as fasteners for particular embodiments.

DESCRIPTION OF THE FIGURES

Several figures are now presented to aid in understanding features of the present invention.

FIGS. 8A-9B show molded parts. (A) Fibers are clearly visible within a beam as well as around holes and corners; (R) batch production of parts.

FIGS. 9A-9B show a 10×10×10 voxel cube consists of 1,000 voxels made up of 6,000 molded parts in (A) corner view and (B) side view.

Several drawings and illustrations have been presented to aid in understanding the present invention. The scope of the present invention is not limited to what is shown in the figures.

DESCRIPTION OF THE PREFERRED EMBODIMENTS

Design

The main parameters for determining the behavior of an architected lattice material are:

1. Lattice geometry: base unit cell topology defines joint connectivity, which informs general lattice behavior (ie: bending or stretch dominated), which can then be used for predictive scaling values.

2. Base material: solid properties (mechanical, thermal, electrical, etc) are used to calculate effective properties of resulting lattice, as well as informing manufacturing processes.

3. Relative density: cell size (edge length) and edge thickness (cross section) can be used to calculate relative density, which must be below 30% for cellular material theory to be valid.

The present invention relates to cuboctahedral lattice geometry (FIGS. 1A-1D), which can be decomposed into vertex connected octahedra (shown in prior art by Cheung/Gregg), or face connected cuboctahedron (the present invention). The material used is determined by the manufacturing process, which is injection molding. This limits the material selection to moldable materials, but still offers several high-performance options such as glass fiber and carbon fiber reinforced polymer (GFRP, CFRP). The size of the lattice can vary based on the application. As an example, a version with a 75 mm lattice pitch will be used.

Figure 1A:
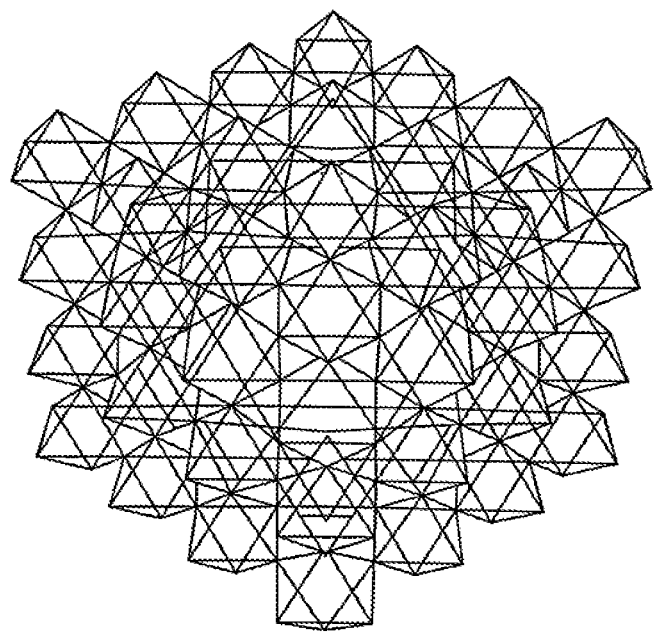
FIGS. 1A-1E show prior art in steps the transition from vertex connected octahedra to face connected cuboctahedron.
Figure 1B:
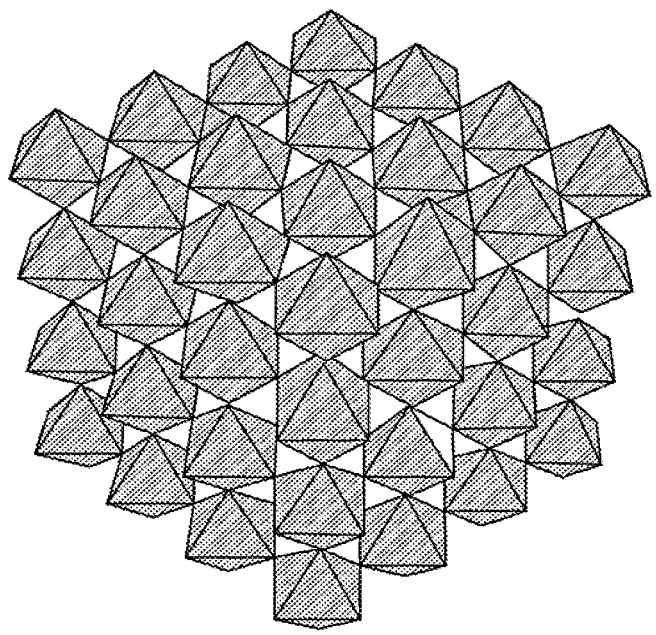
Figure 1C:
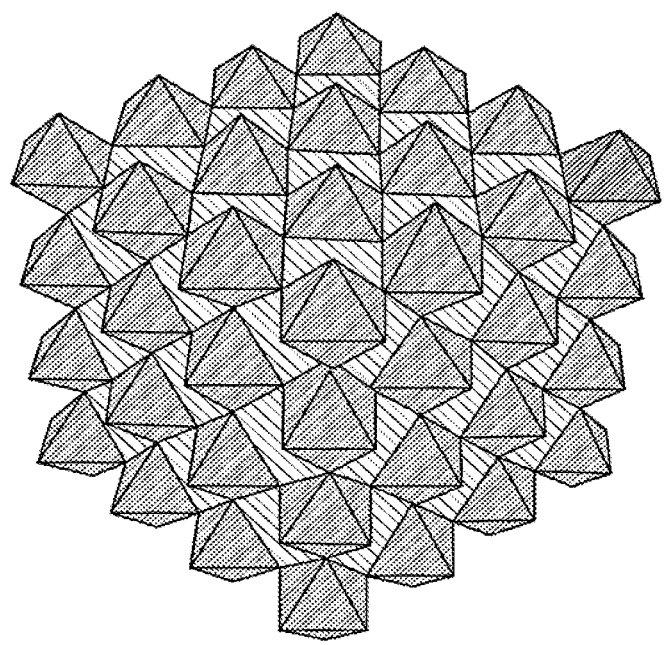
Figure 1D:
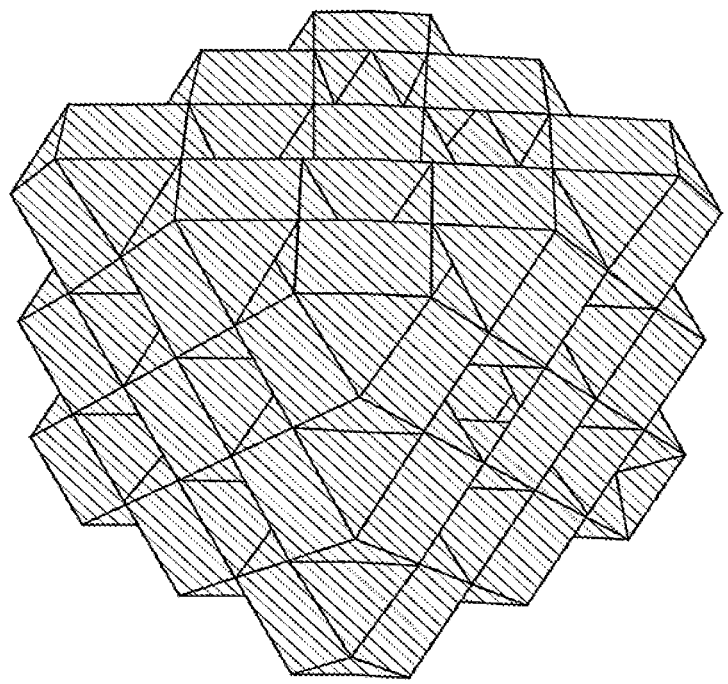
Figure 1E:
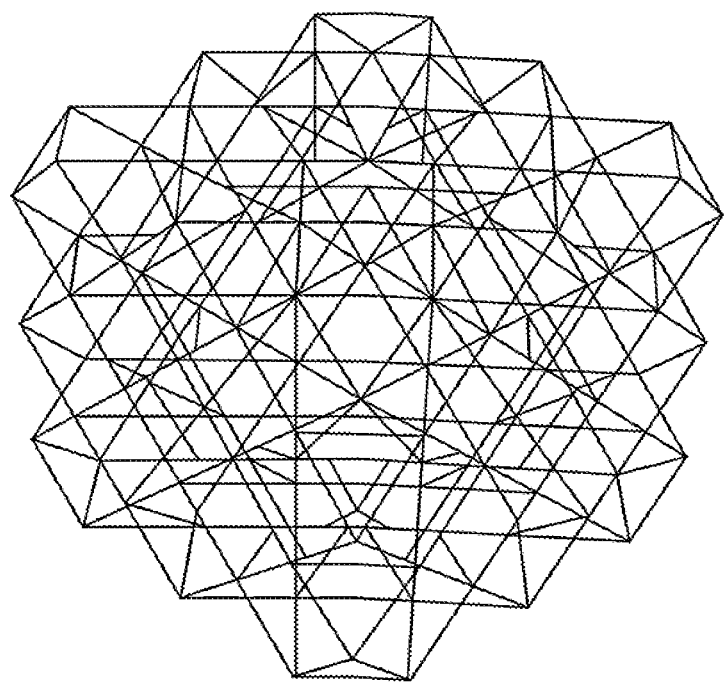
Figure 2A:
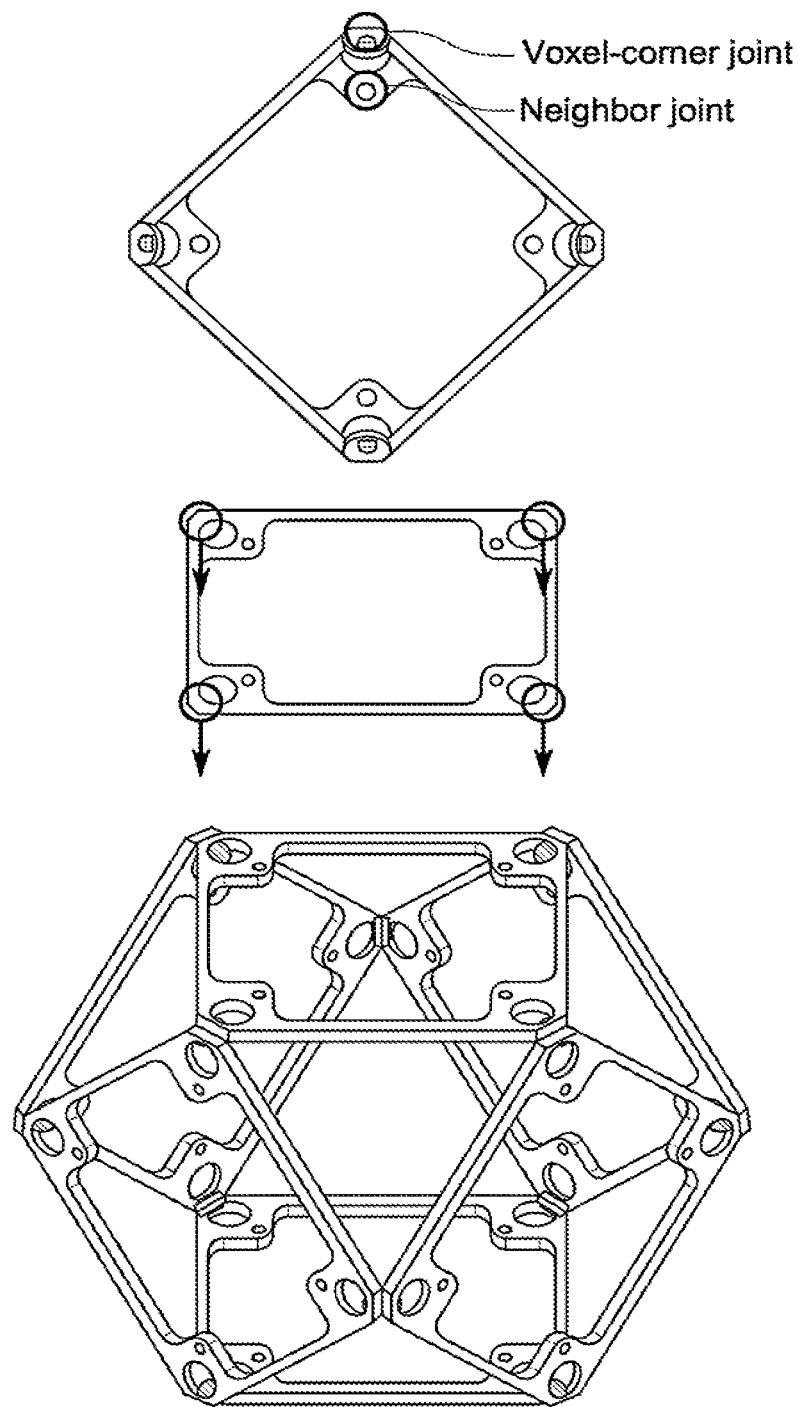
FIGS. 2A-2C show in steps the decomposition of a face, voxel, and 2×2×2 voxel lattice cube.
Figure 2B:
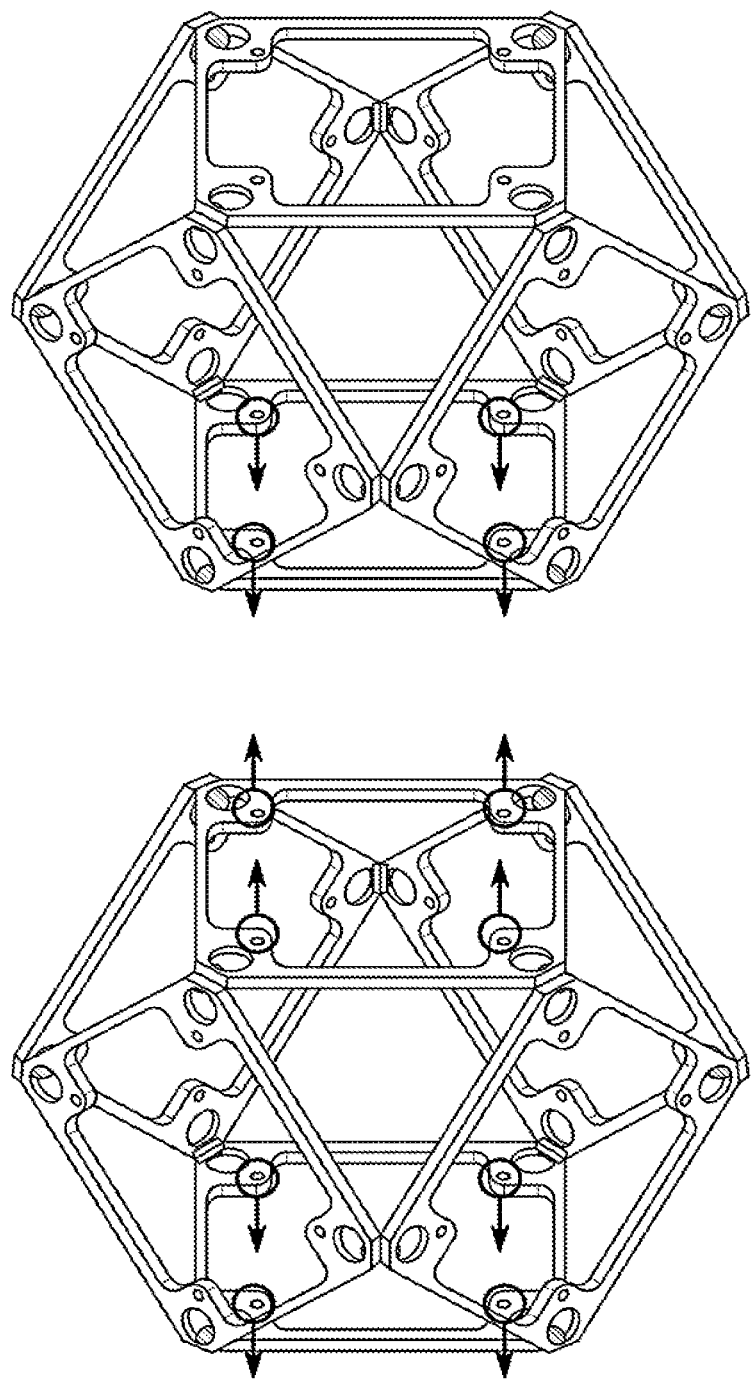
Figure 2C:
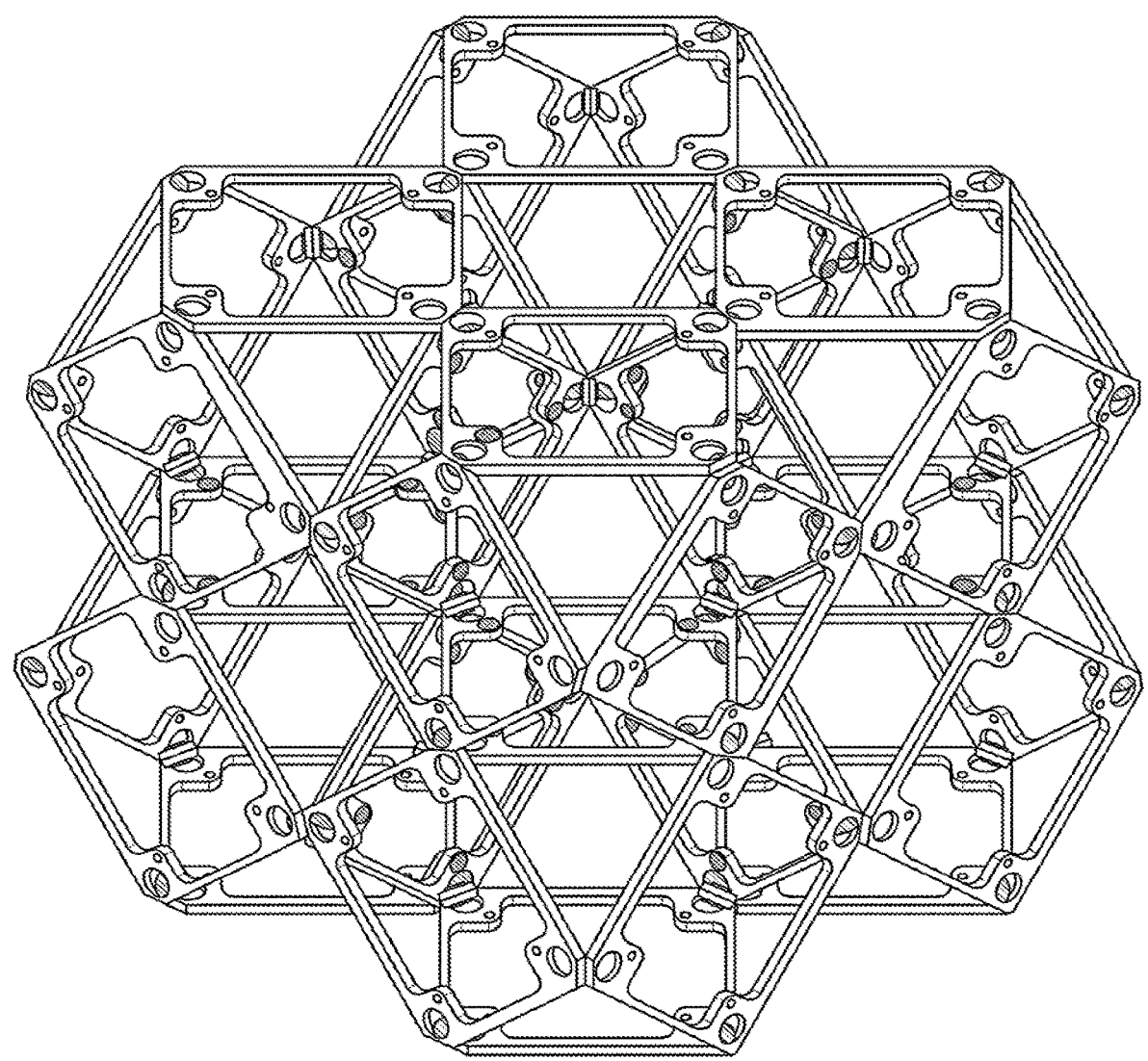

The decomposition of the cuboctahedron unit cell is shown in FIGS. 2A-2C. In contrast to prior art (Cheung/Gregg), the objective is to reduce mold complexity, and thus cost, by molding individual faces which then are assembled into the voxel building block (Shown in FIGS. 3A-3C). This assembly can be achieved with a number of methods, including permanent methods such as welding or gluing, and reversible methods such as bolting or riveting. In the following case, we use blind rivets as fasteners.

A single face is typically square in shape, and has two types of joints at each vertex: a voxel-corner joint and a neighbor joint. The voxel corner joint is at a 45-degree angle out of plane from the square face (FIGS. 3A-3C), and is used to join square faces together to form a full voxel. The neighbor joint is offset from the corner, is in plane with the square face, and is used to join a single voxel to another voxel.

Figure 3A:
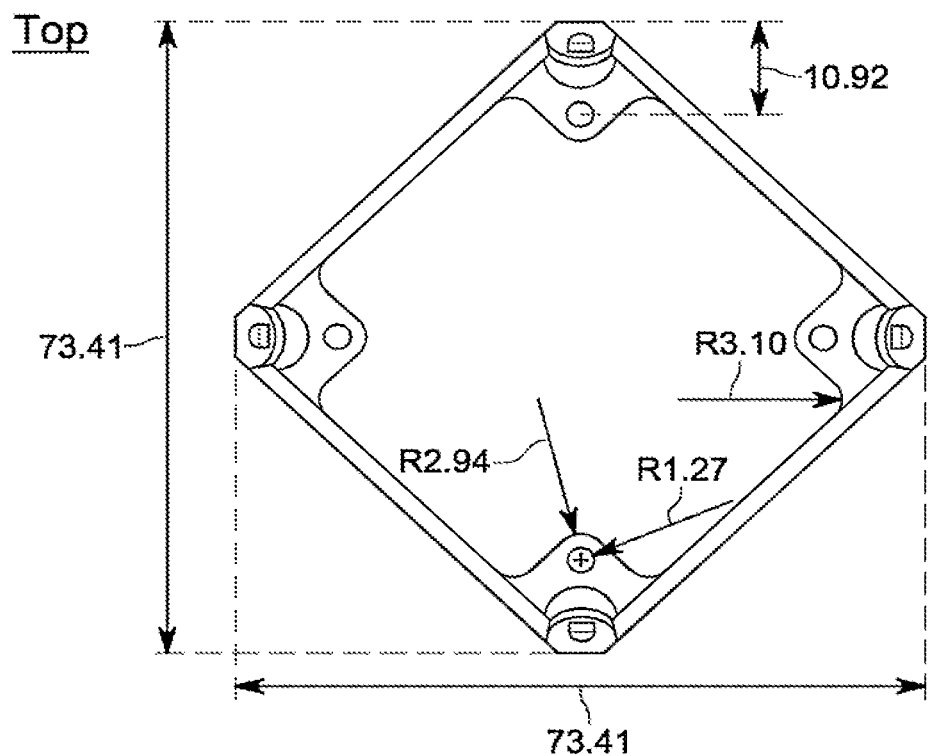
FIGS. 3A-3C show dimensioned drawings of a single part (units in mm) in (A) top view, (B) bottom view and (C) isometric view.
Figure 3B:
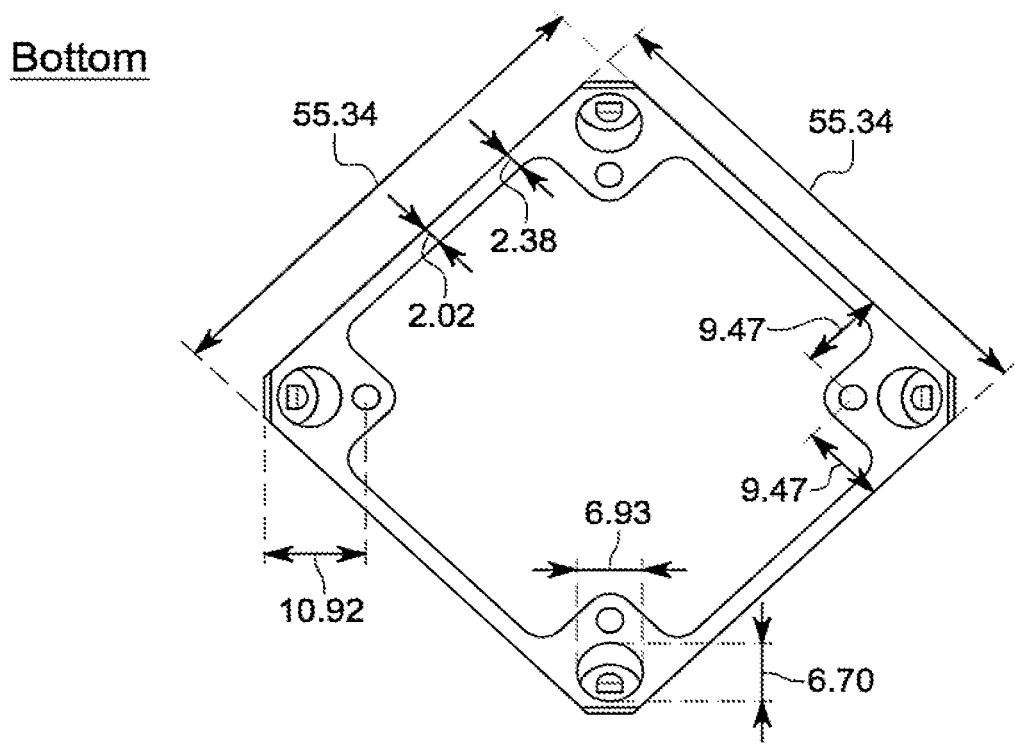
Figure 3C:
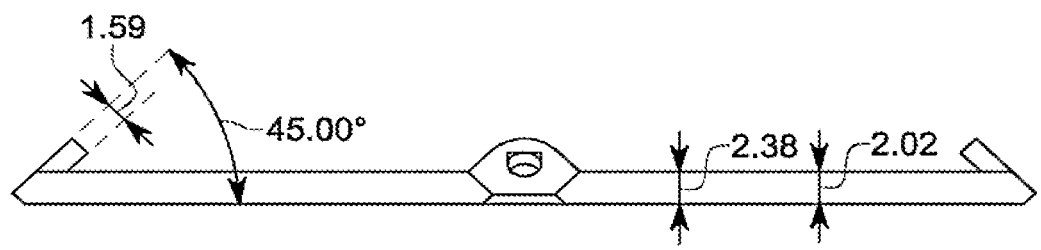
Figure 3C:
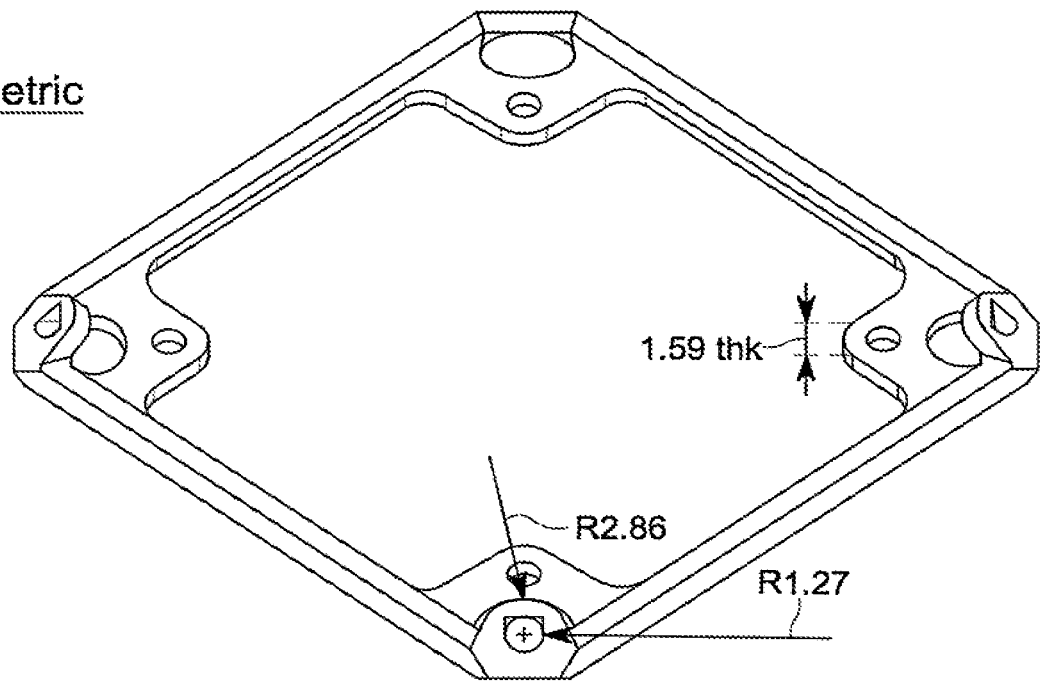
Figure 4A:
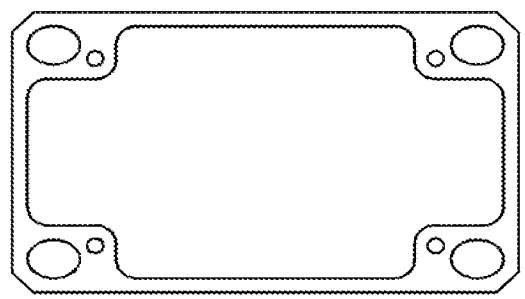
FIGS. 4A-4F show step by step, the assembly of a single voxel with six faces.
Figure 4B:
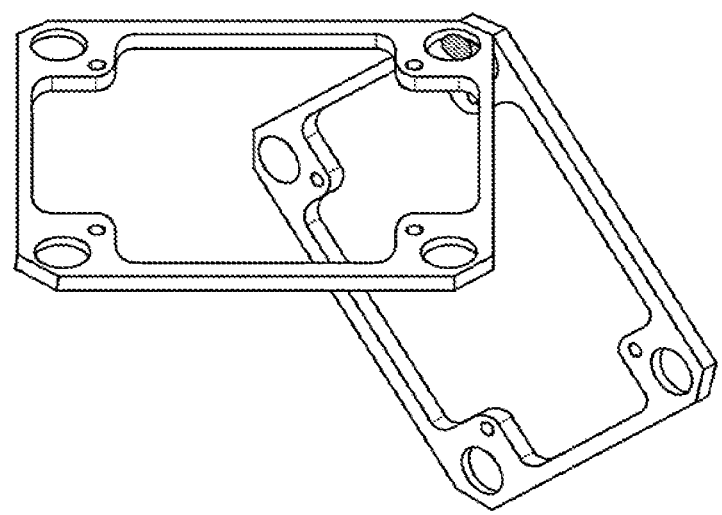
Figure 4C:
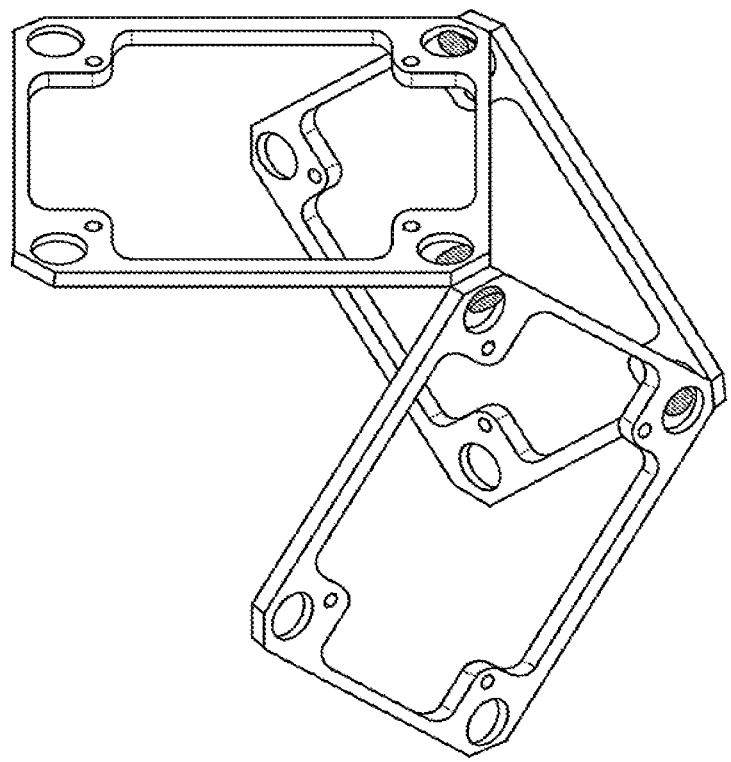
Figure 4D:
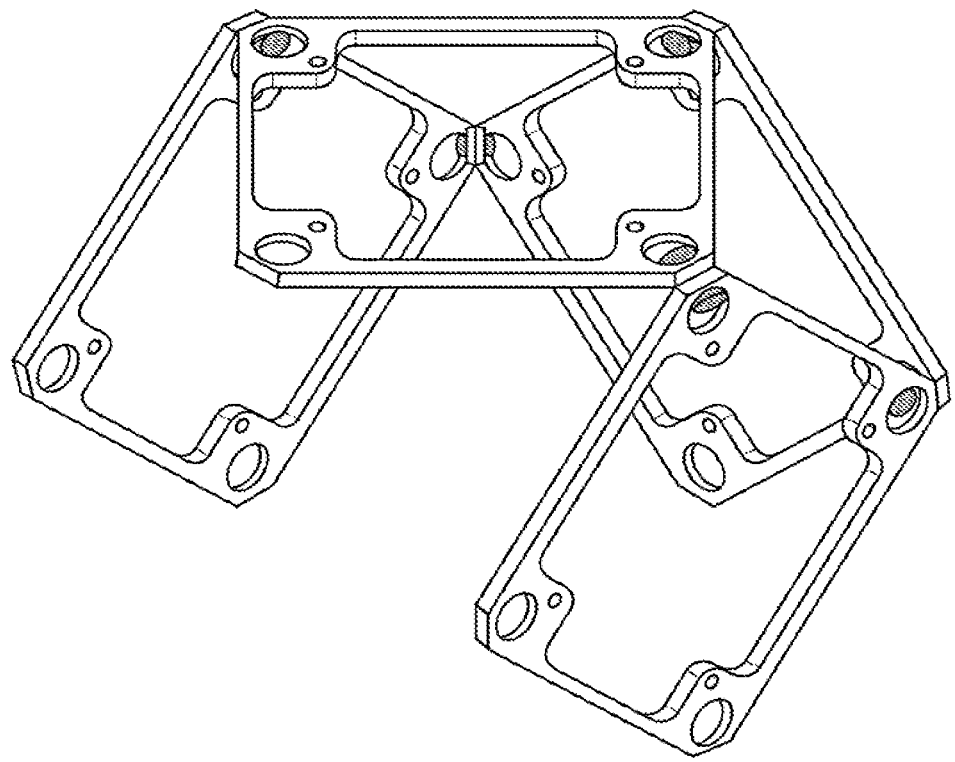
Figure 4E:
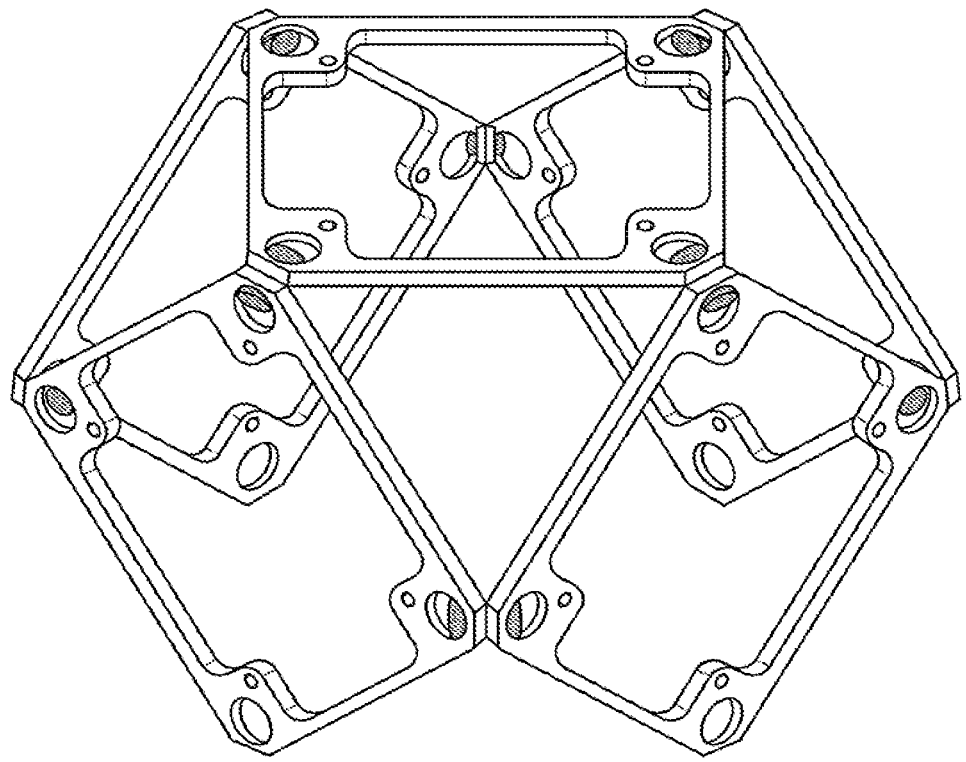
Figure 4F:
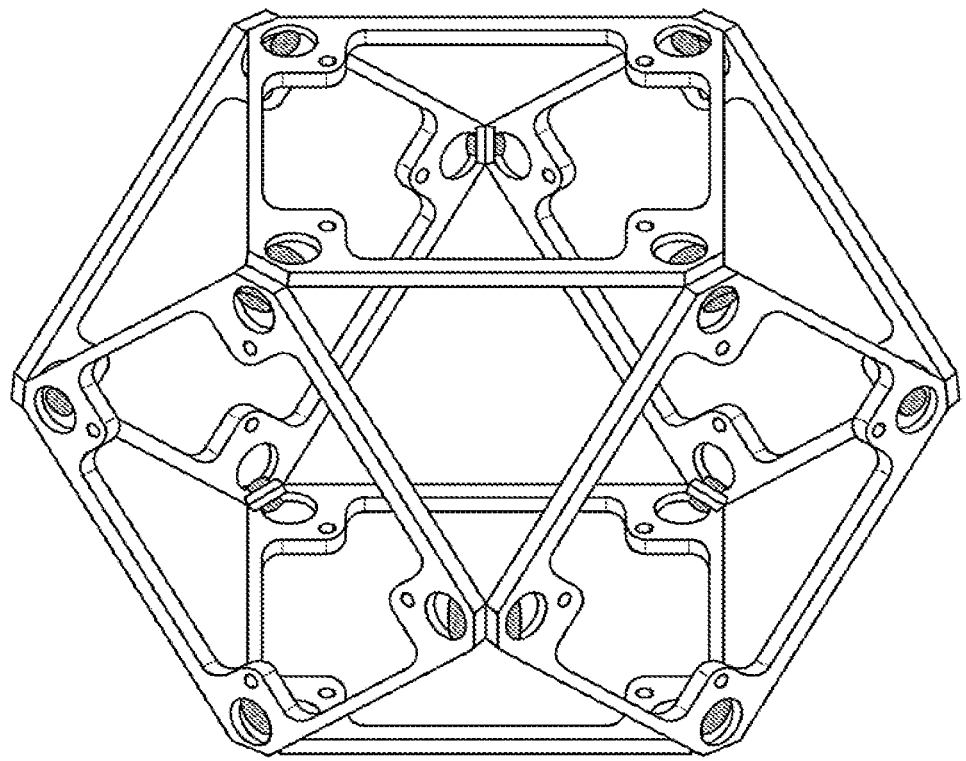
Figure 5A:
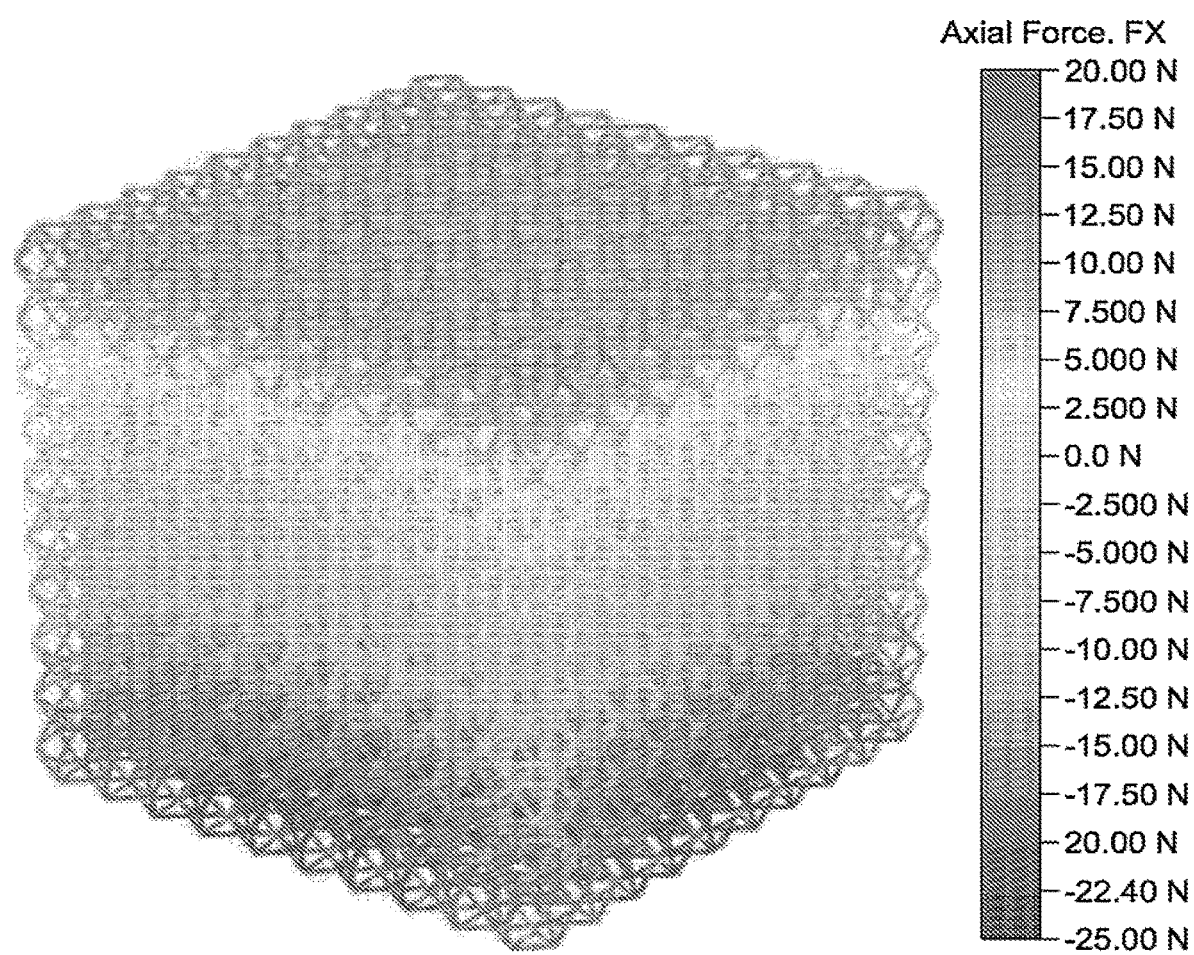
FIGS. 5A-5C show simulation screenshots (L to R) of (A) a 10×10×10 cube in uniaxial compression with element displacement contours, (B) closeup of 2×2×2 area, and (C) axial force contours.
Figure 5B:
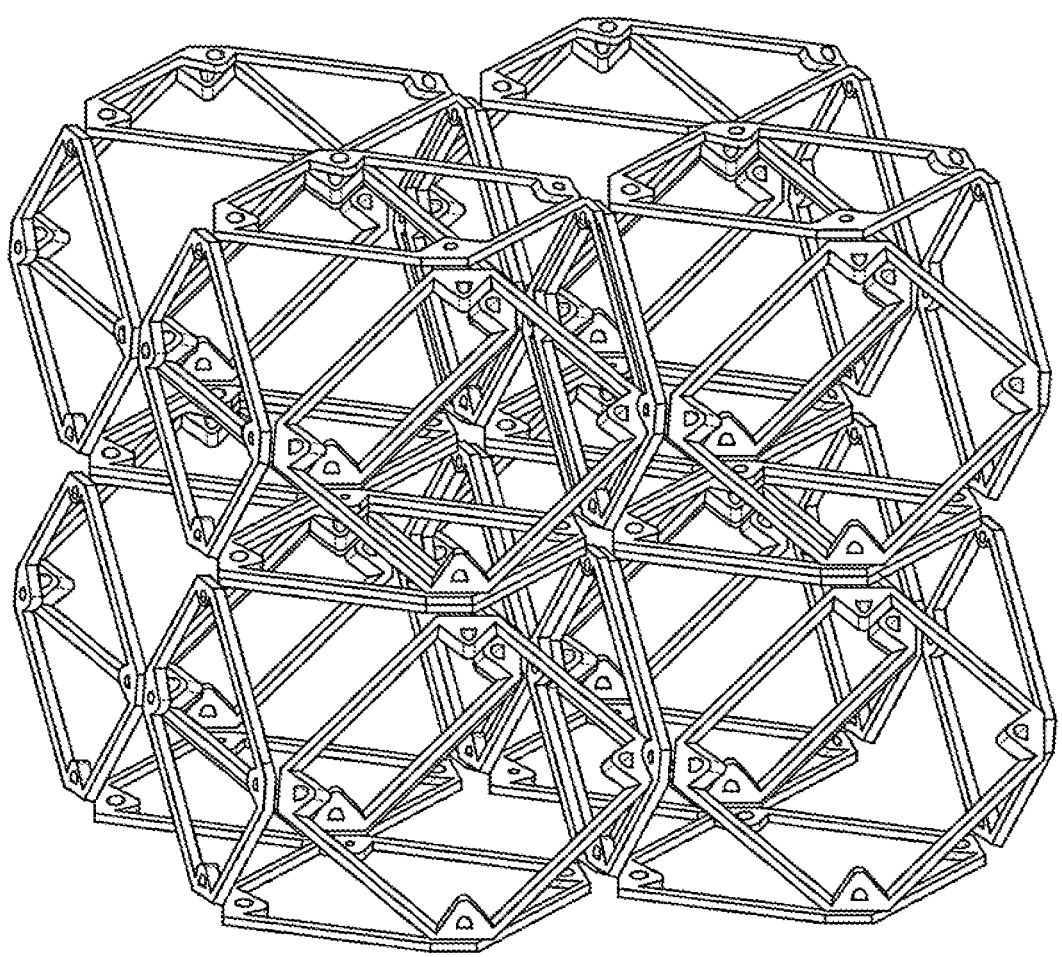
Figure 5C:
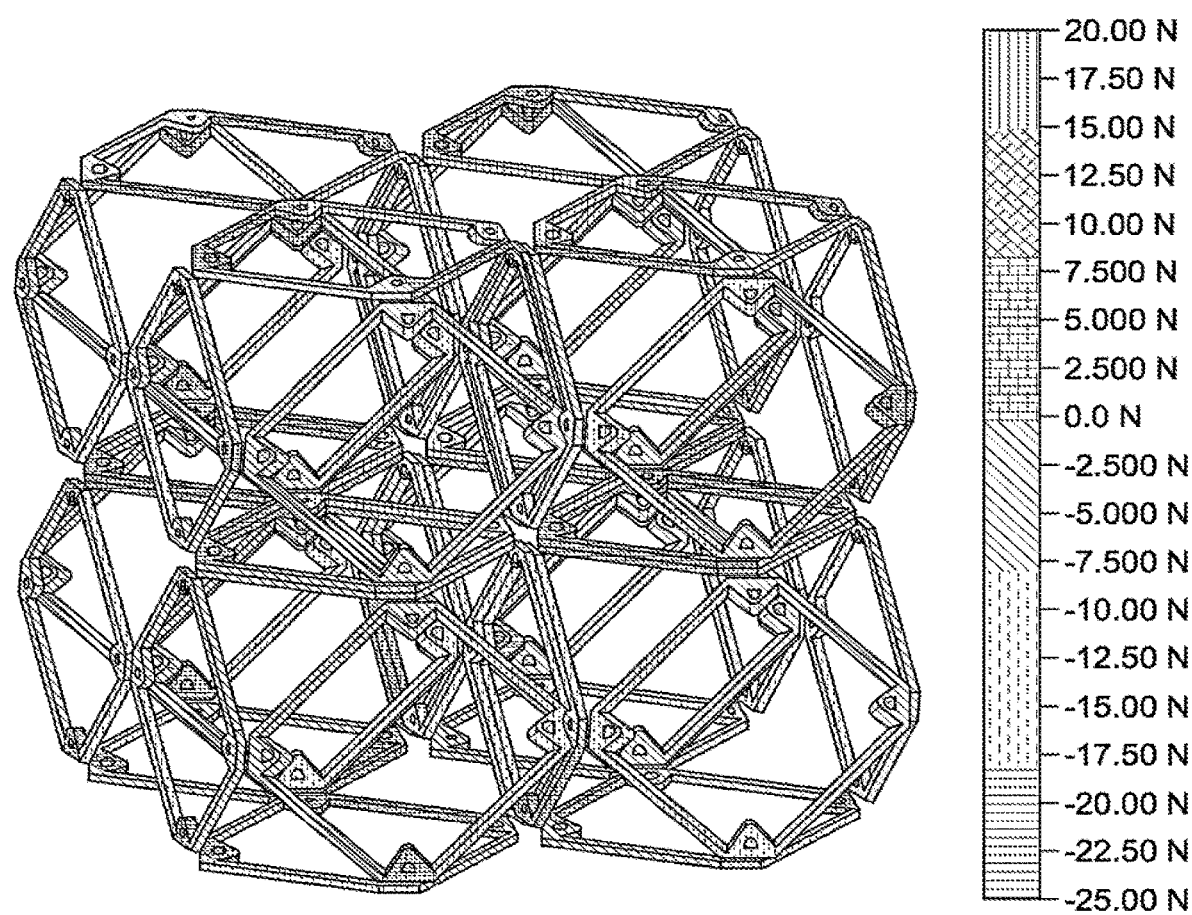
Figure 6A:
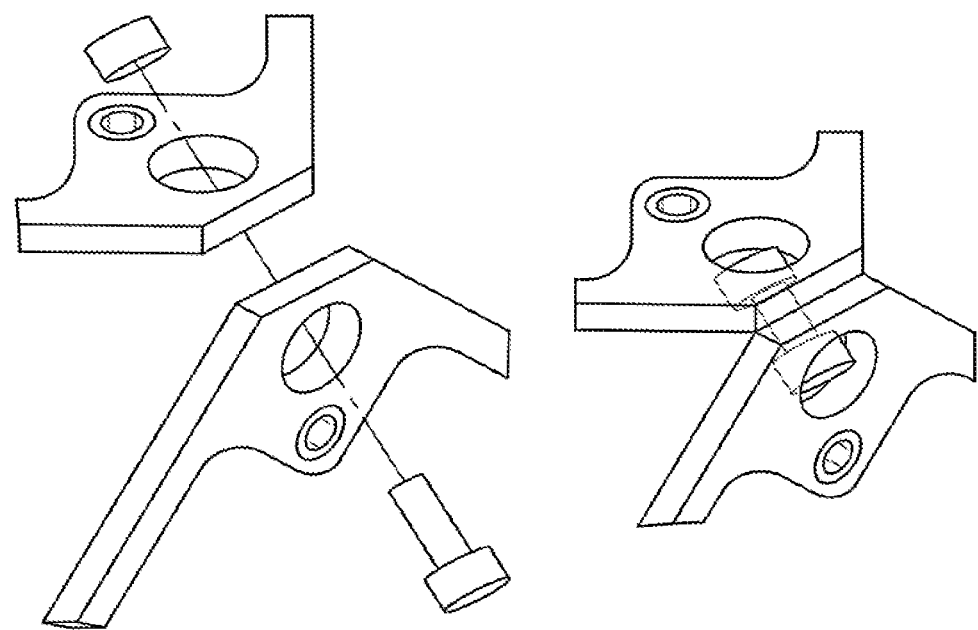
FIGS. 6A-6D show in steps a joint design and simulation. Stress concentrations can be seen in the corner.
Figure 6B:
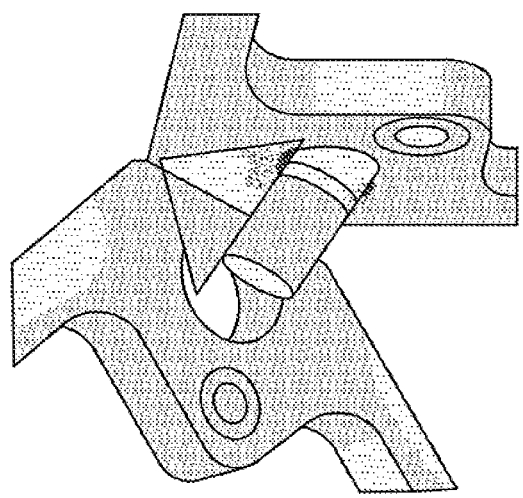
Figure 6C:
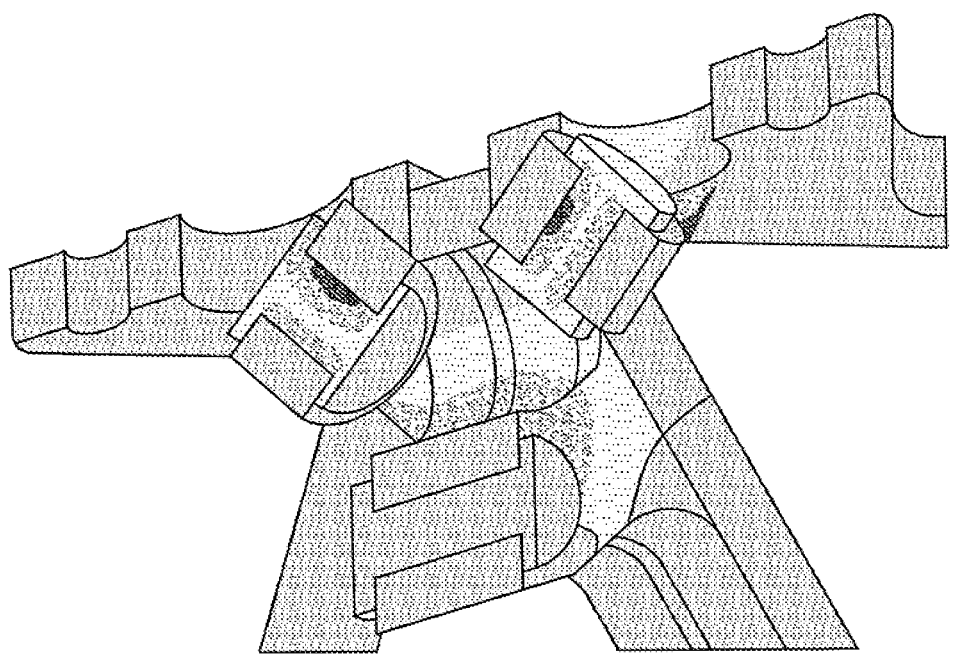
Figure 6D:
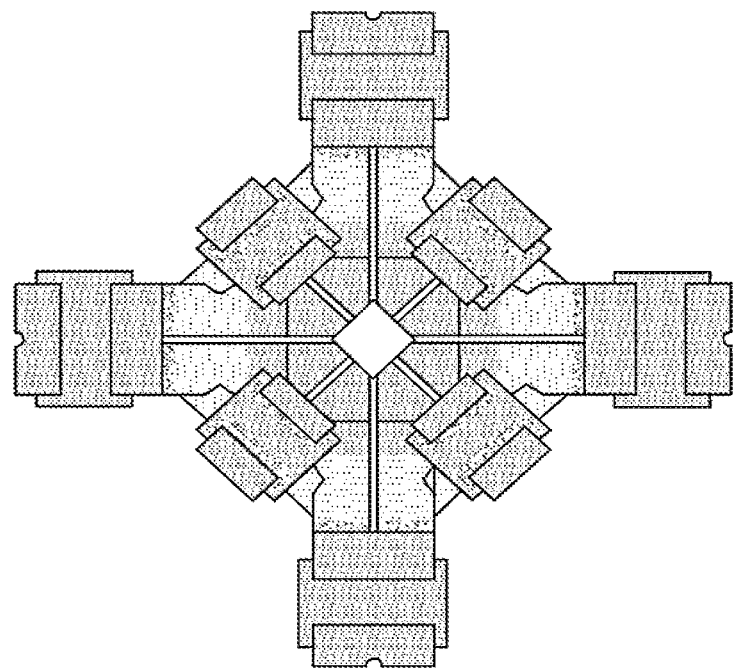
Figure 7A:
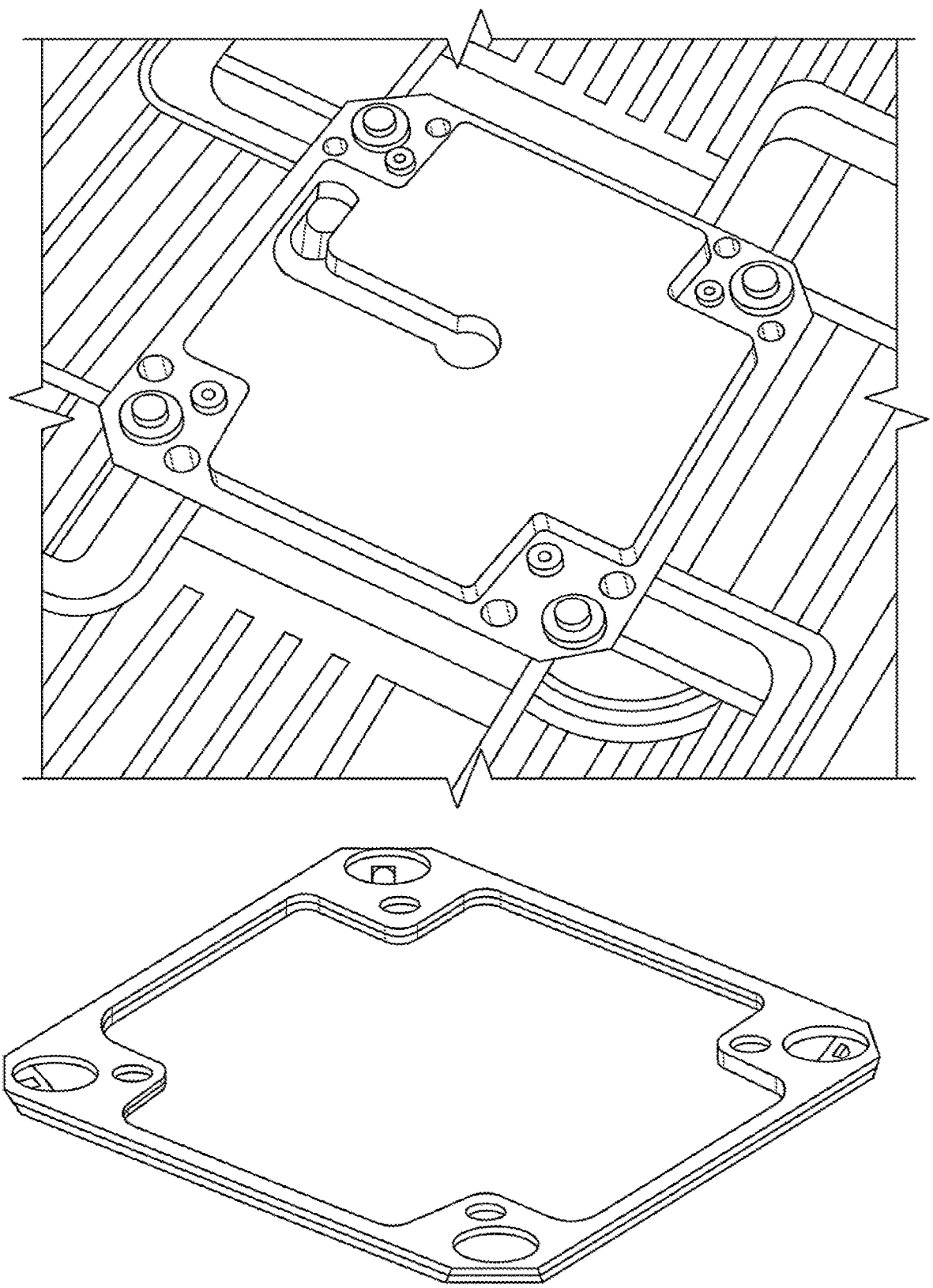
FIGS. 7A-7C show two-part mold tooling cavity and core (A-B) and mold flow analysis (C).
Figure 7B:
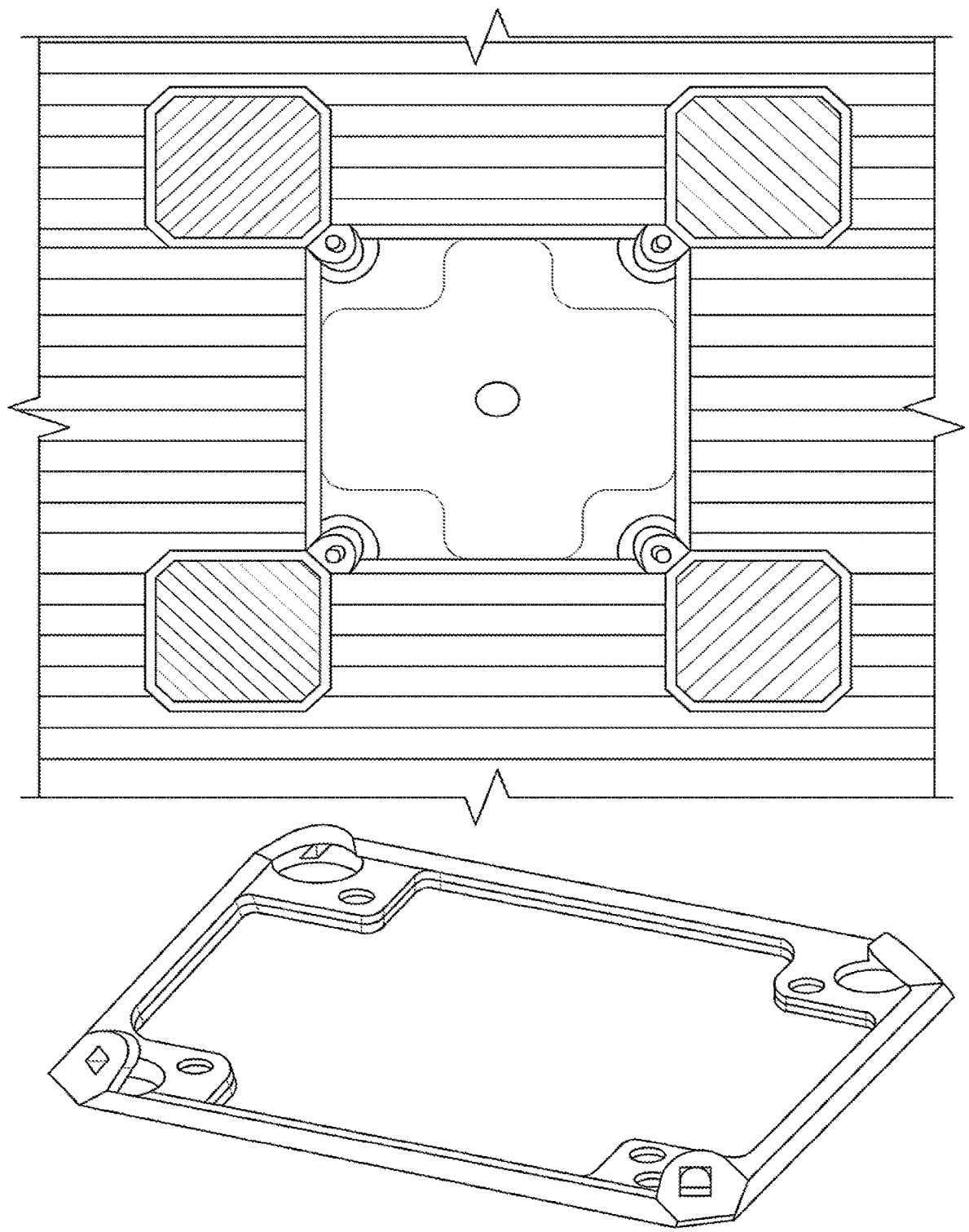
Figure 7C:
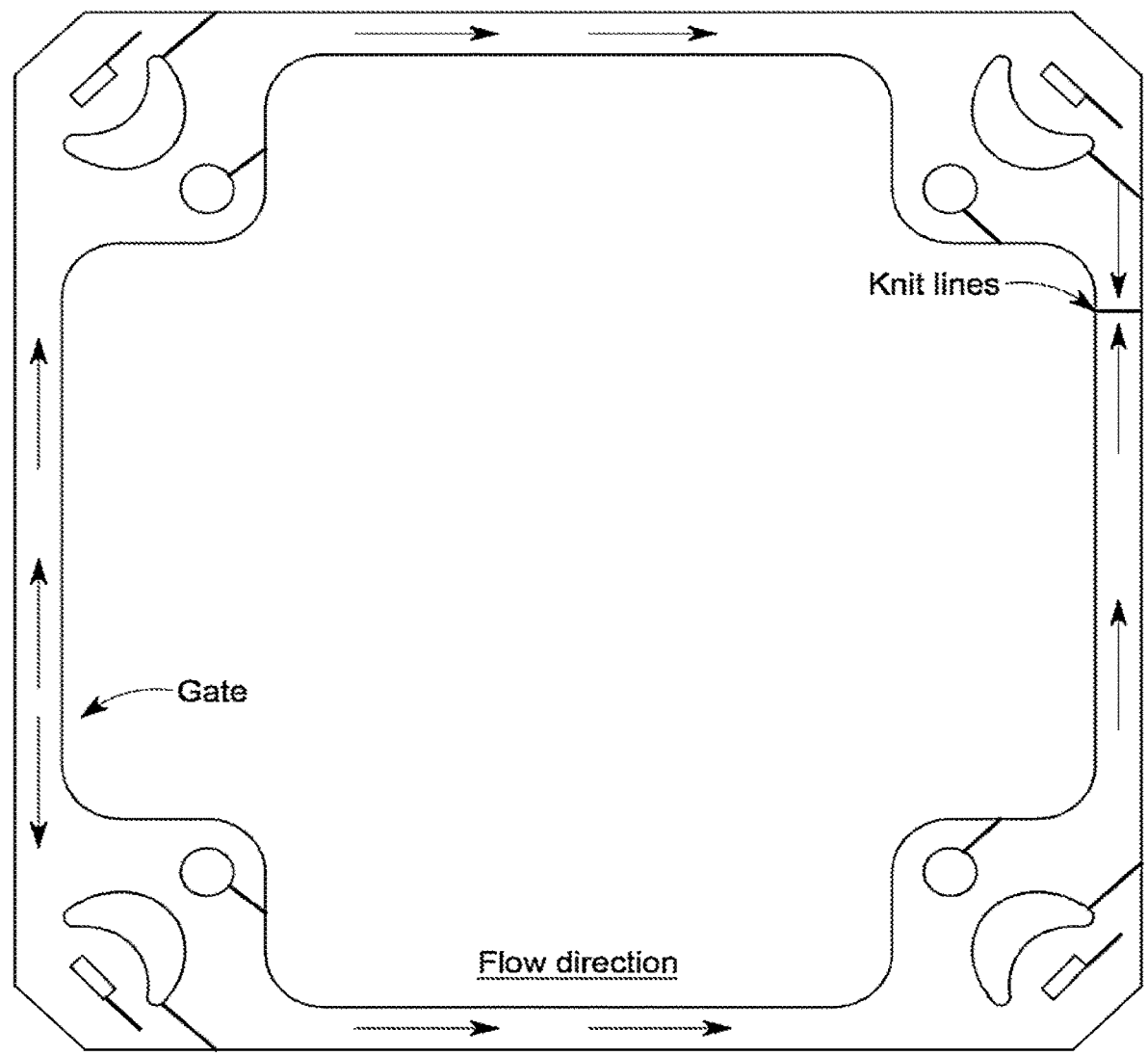
Figure 9A:
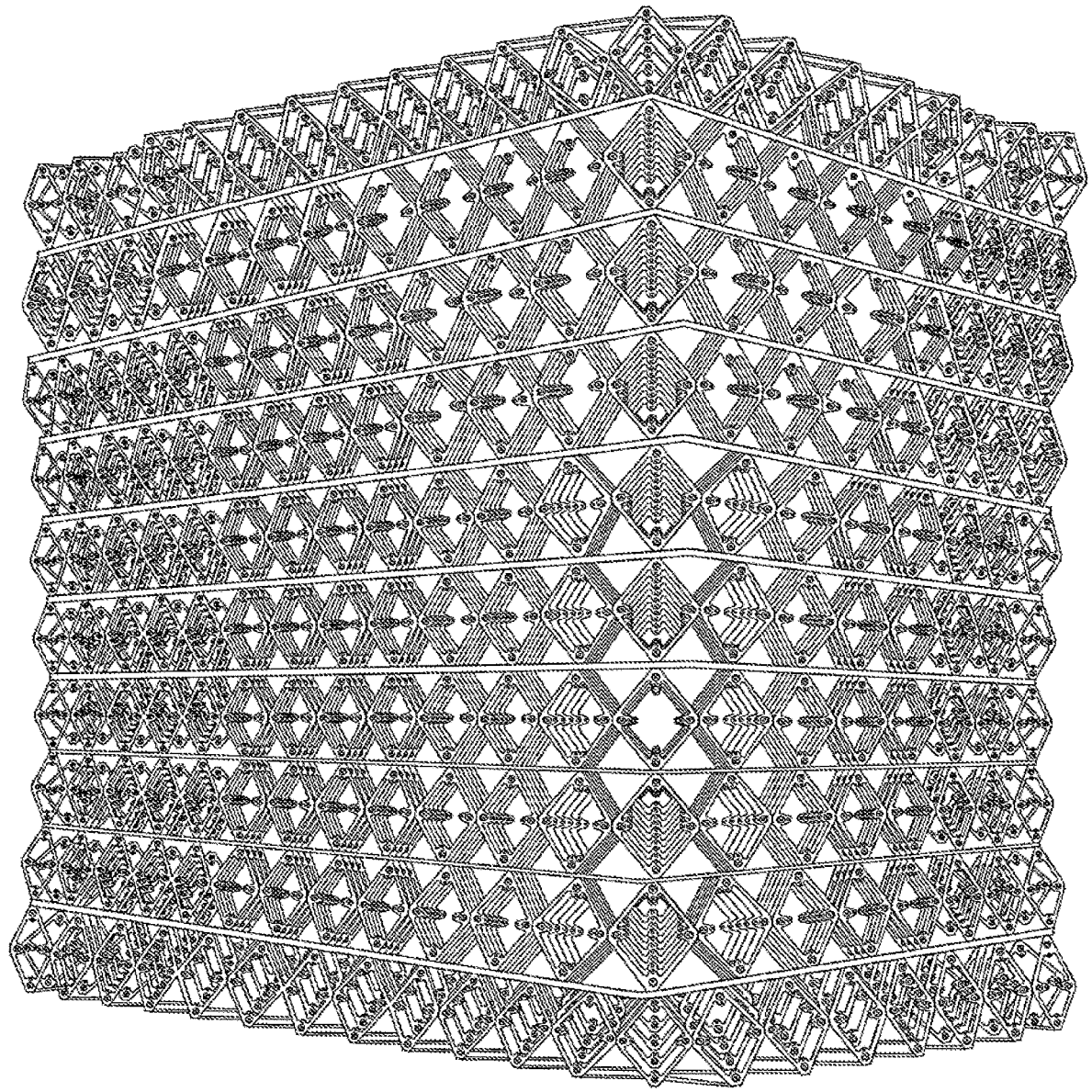
Figure 9B:
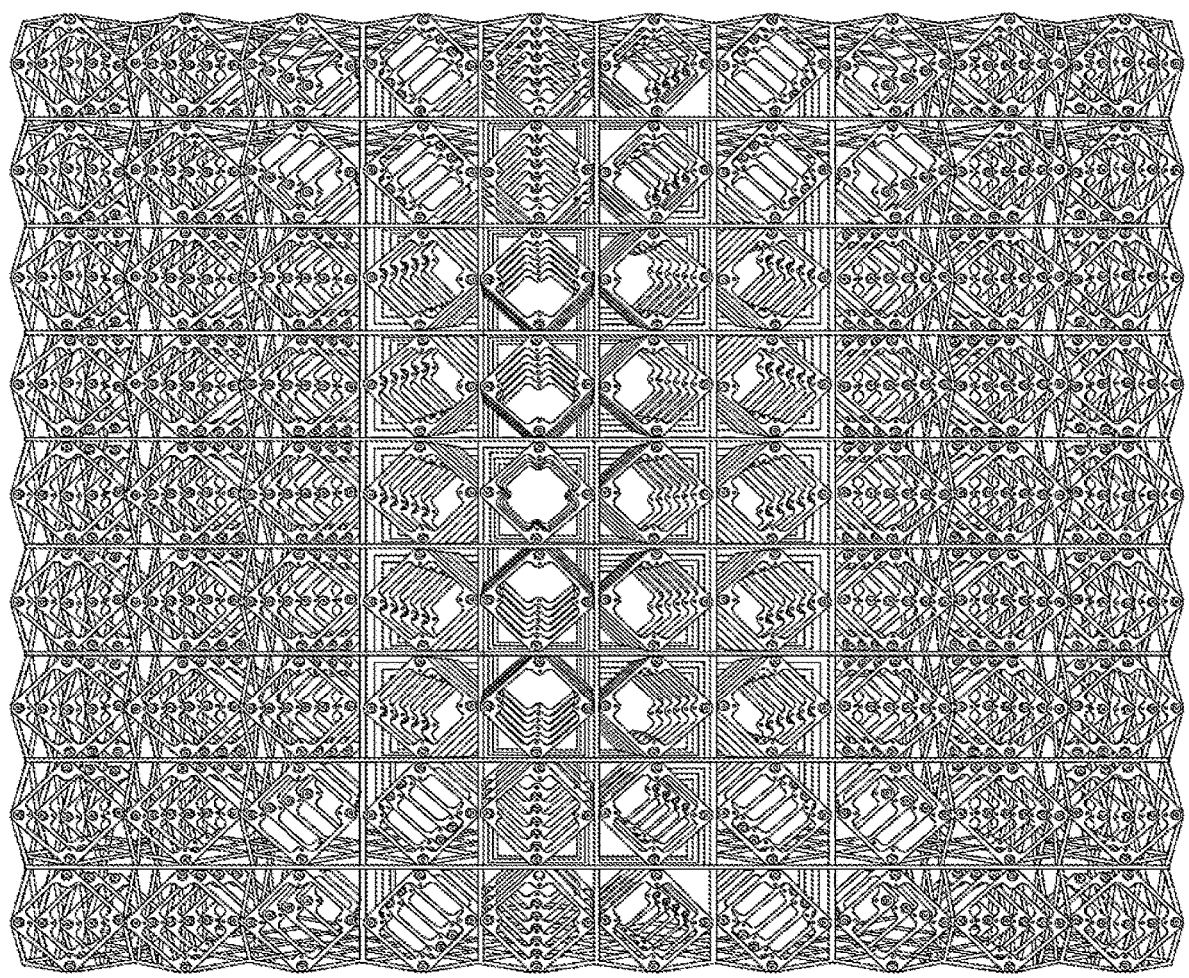
Figure 10A:
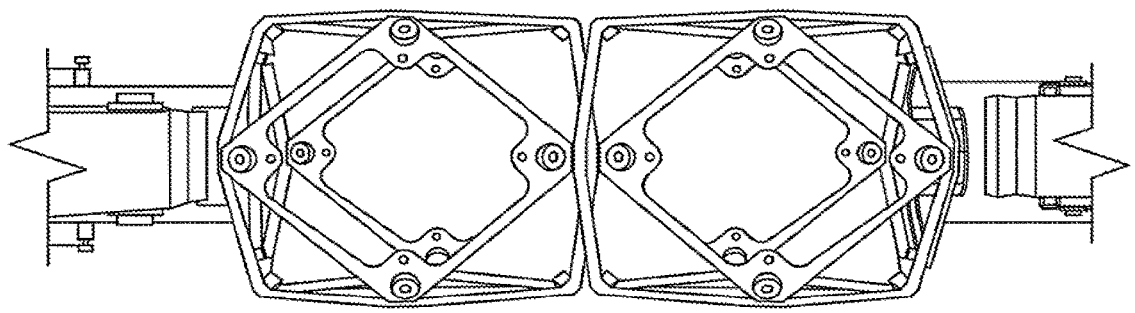
FIGS. 10A-10B show tensile testing of voxel to voxel connection; (A) test setup and (B) extension vs. load.
Figure 10B:
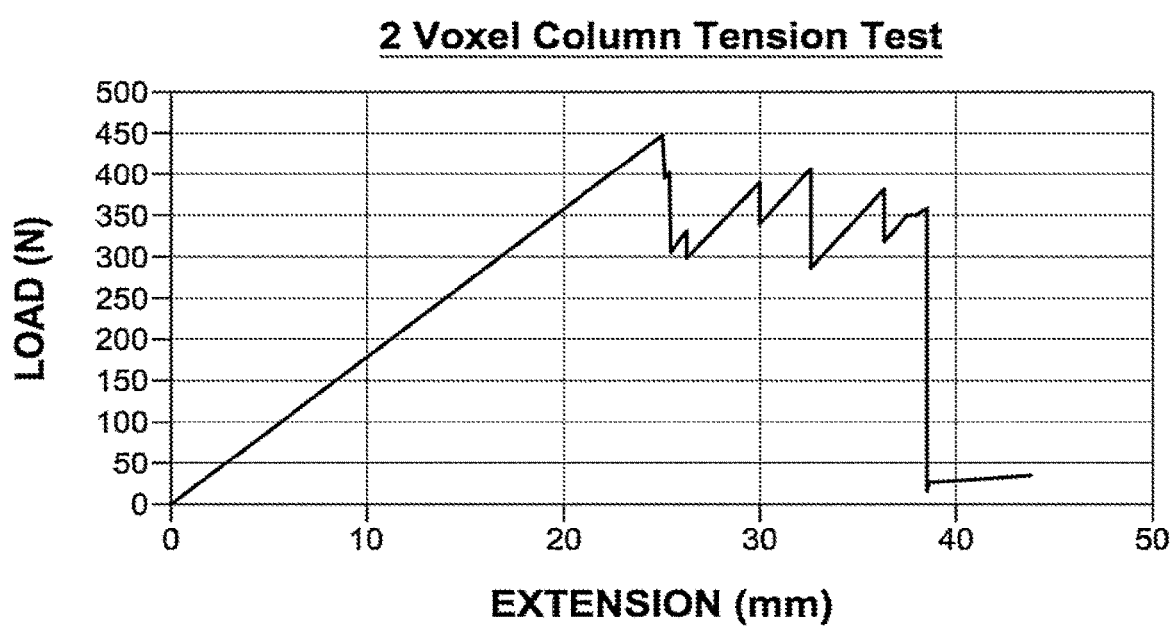
Figure 11A:
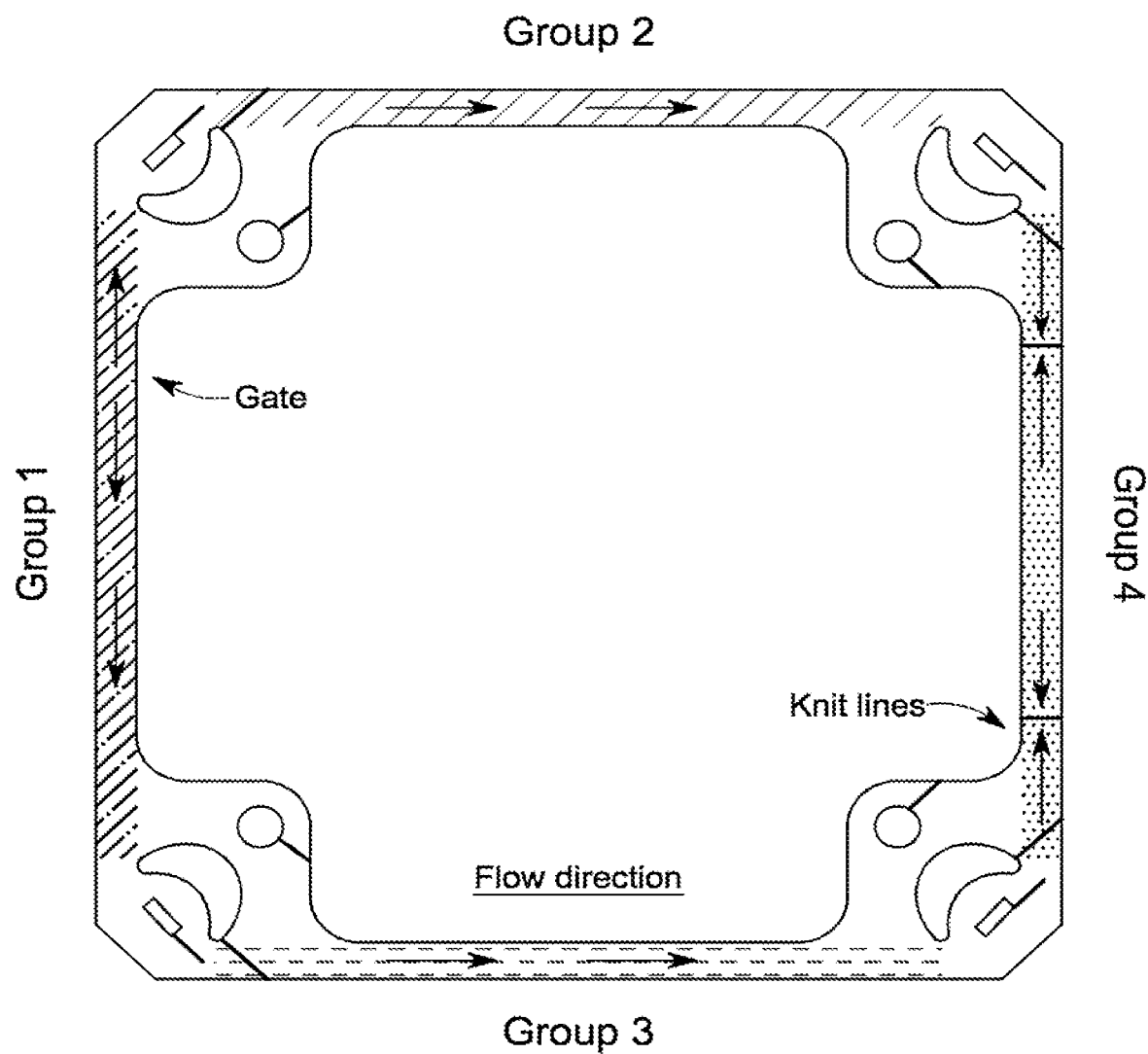
FIGS. 11A-11B show characterization of strut modulus based on relative location on part.
Figure 11B:
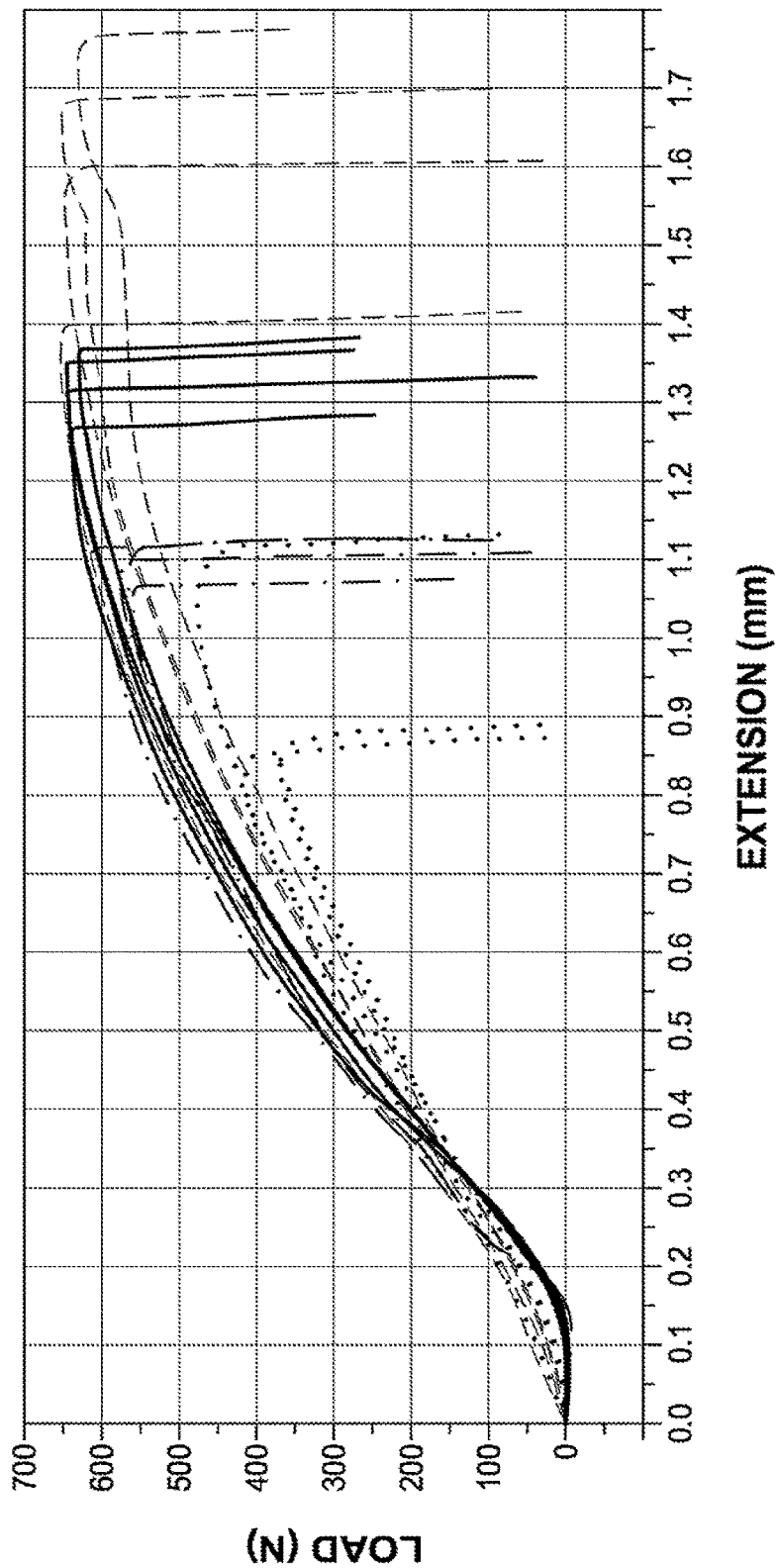
Figure 12A:
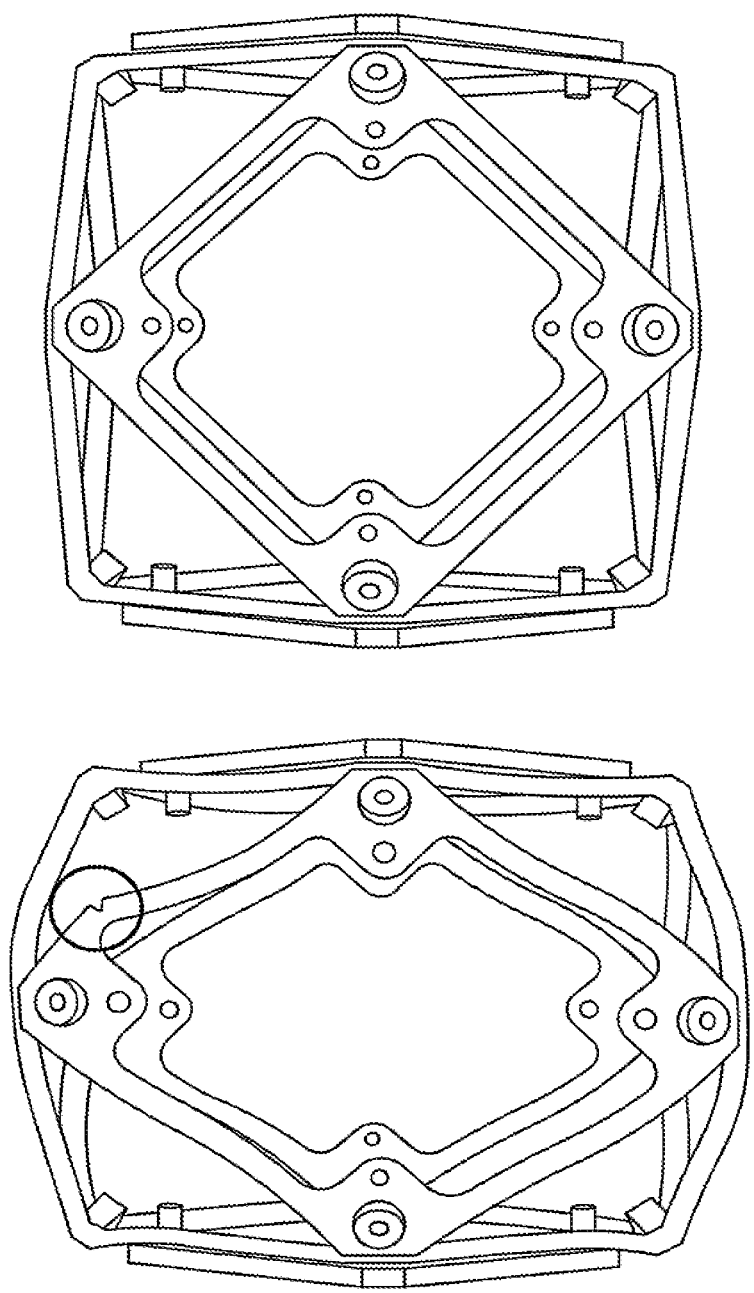
FIGS. 12A-12C show 1×1×1, 2×2×2, and 3×3×3 structures compression testing. Bottom row highlights initial beam failure locations.
Figure 12B:
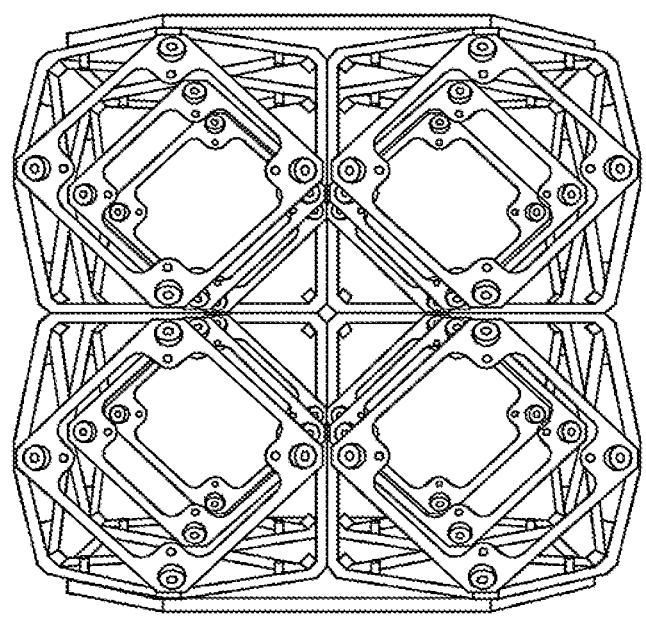
Figure 12B:
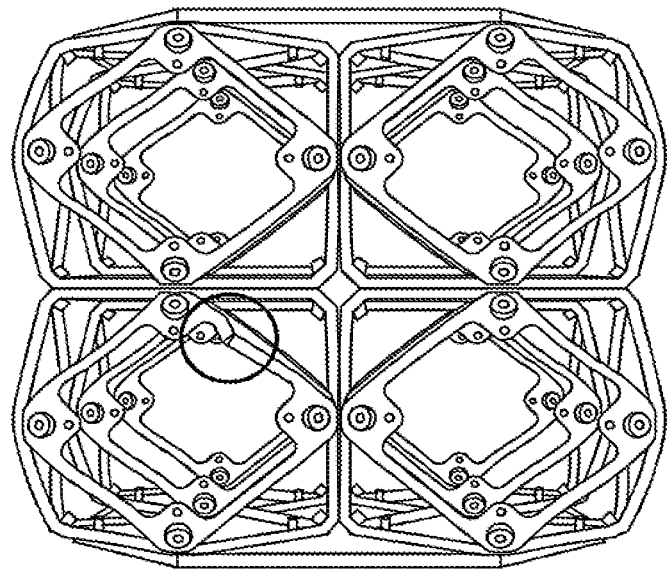
Figure 12C:
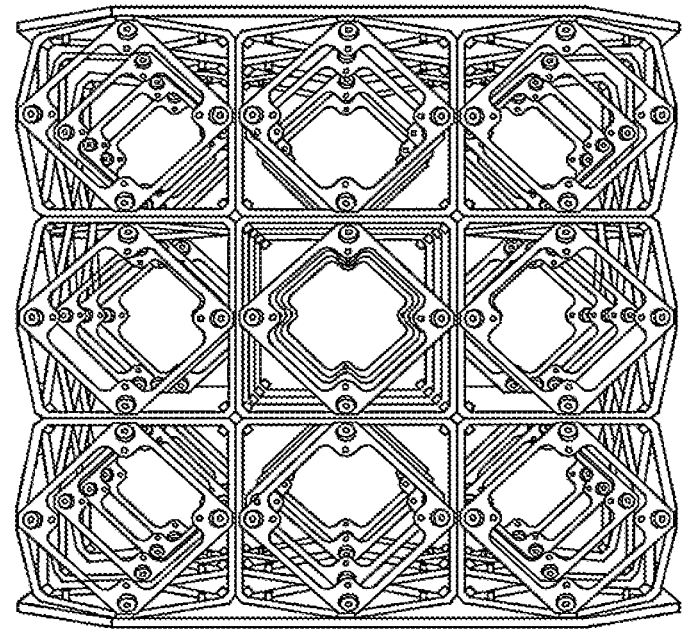
Figure 12C:
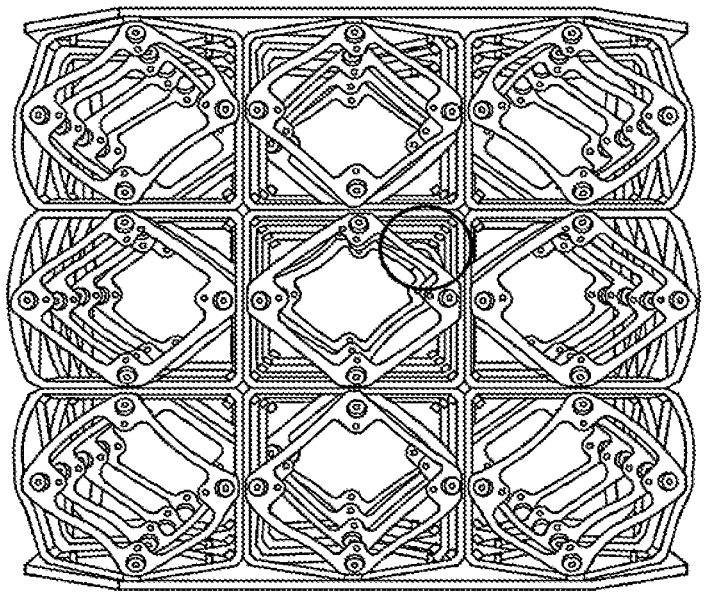
Figure 13A:
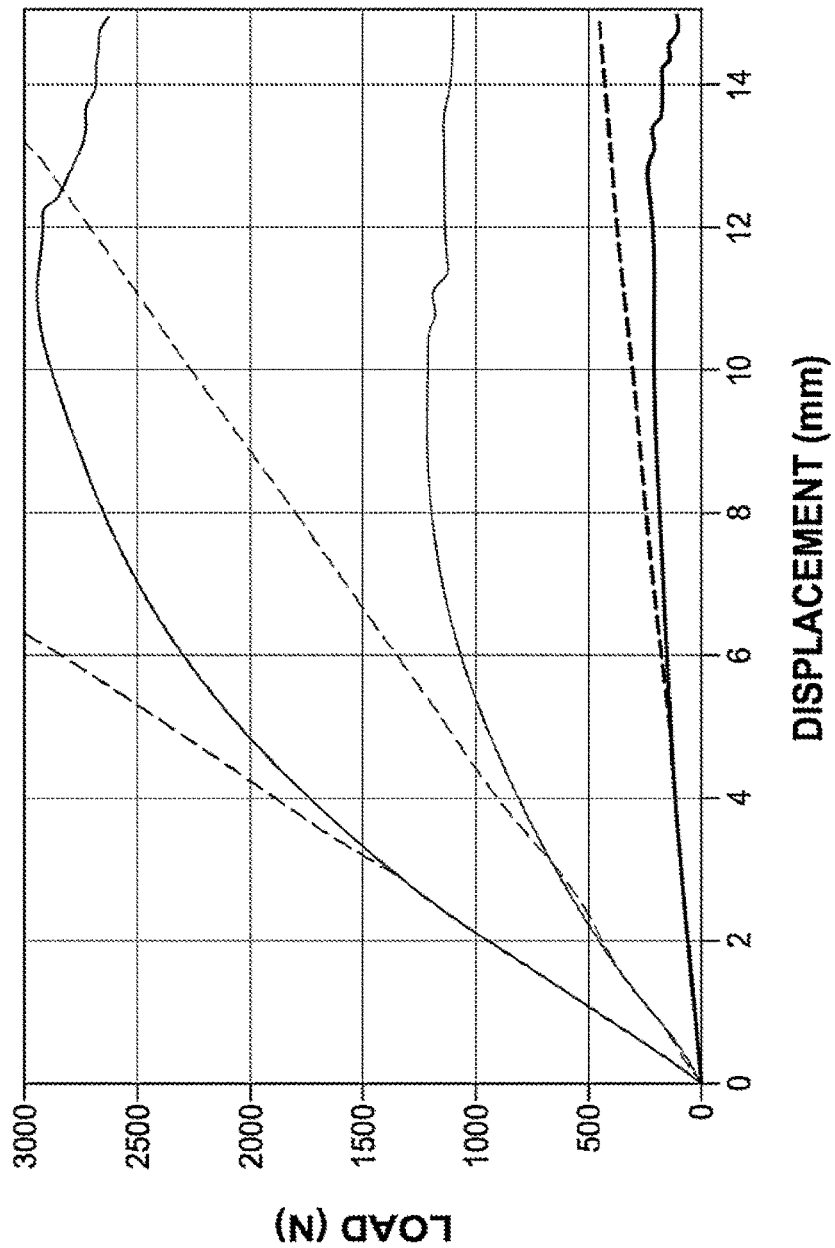
FIGS. 13A-13B Testing results. (A) Load vs displacement for range of specimens, (B) Comparison of analytical and numerical predictions with experimental results showing convergence with increasing voxel count.
Figure 13B:
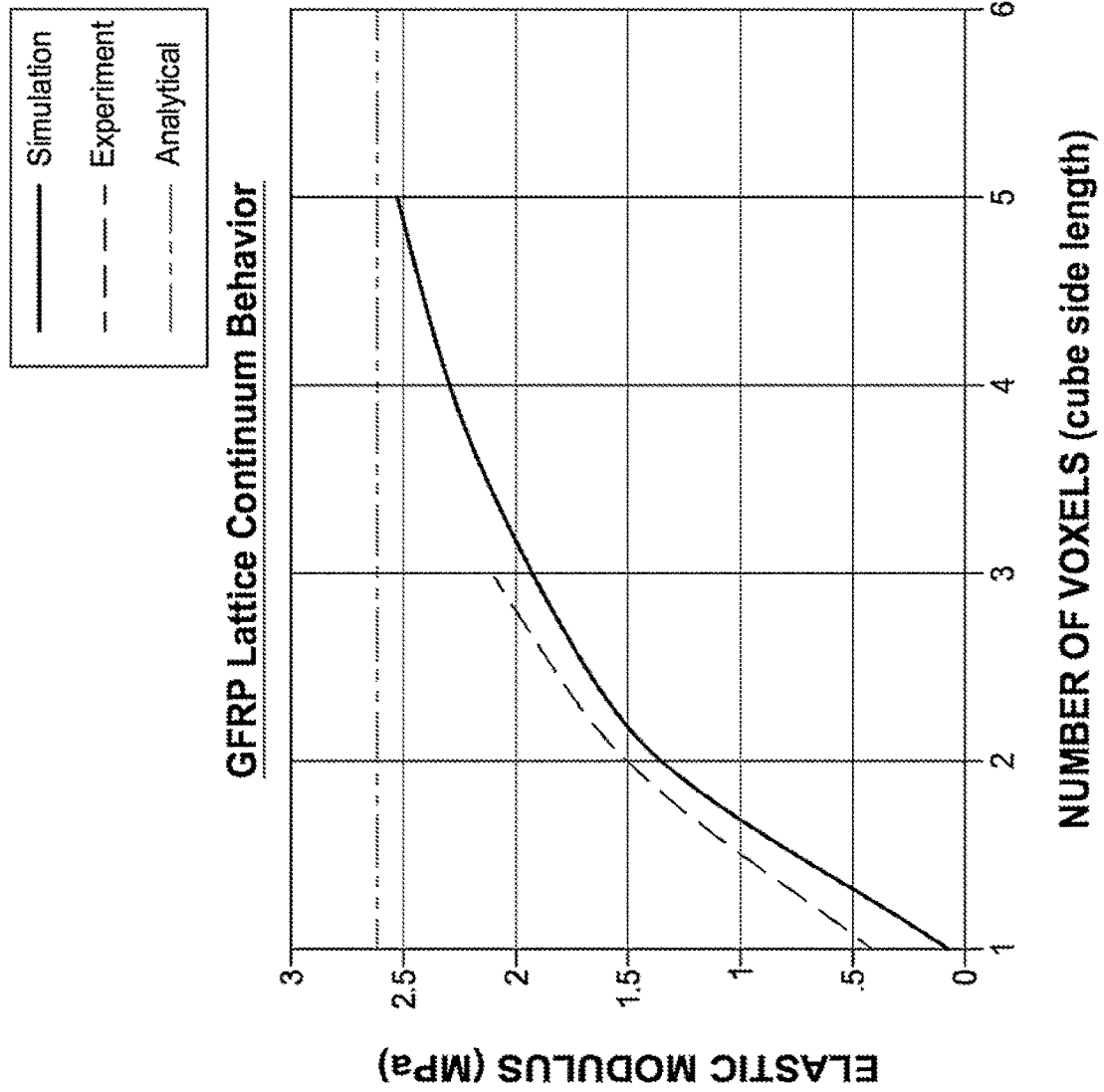

FIGS. 1A-1E show in steps the transition from vertex connected octahedra to face connected cuboctahedron. FIGS. 2A-2C show in steps the decomposition of a face, voxel, and 2×2×2 voxel lattice cube. FIGS. 3A-3C show dimensioned drawings of a single part (units in mm) in (A) top view, (B) bottom view and (C) isometric view. FIGS. 4A-4F show step by step, the assembly of a single voxel with six faces. FIGS. 5A-5C show simulation screenshots (L to R) of (A) a 10×10×10 cube in uniaxial compression with element displacement contours, (B) closeup of 2×2×2 area, and (C) axial force contours. FIGS. 6A-6D show in steps a joint design and simulation. Stress concentrations can be seen in the corner. FIGS. 7A-7C show two-part mold tooling cavity and core (A-B) and mold flow analysis (C). FIGS. 8A-9B show molded parts. (A) Fibers are clearly visible within a beam as well as around holes and corners; (B) batch production of parts. FIGS. 9A-9B show a 10×10×10 voxel cube consists of 1,000 voxels made up of 6,000 molded parts in (A) corner view and (B) side view. FIGS. 10A-10B show tensile testing of voxel to voxel connection; (A) test setup and (B) extension vs. load. FIGS. 11A-11B show characterization of strut modulus based on relative location on part. FIGS. 12A-12C show 1×1×1, 2×2×2, and 3×3×3 structures compression testing. Bottom row highlights initial beam failure locations. FIGS. 13A-13B Testing results. (A) Load vs displacement for range of specimens, (B) Comparison of analytical and numerical predictions with experimental results showing convergence with increasing voxel count.

Simulation

As established in the literature, the global behavior of the assembled lattice material is governed by the struts and not the joints. Specifically, this means the main failure mode is beam-dominated. To ensure this, the joints are designed to fail at higher loads than the beams when the lattice is loaded. There are several failure-mode sequences which are relevant for determining this behavior. First, the loading response of the structure should be linear elastic. Then, it should enter a non-linear elastic regime, which corresponds with elastic buckling of the struts critically. This is a geometric failure, meaning it can be rationally designed into the structure. Next, the structure enters a non-linear plastic regime where beam bending stress begins to deform areas of the beam plastically. Finally, the initial failure occurs along the beam. Typically, this will occur near a flaw in the beam such as at the injection molding gate/s or knit lines; thus, the location of these flaws is very important. Specifically, these failure modes determine the strength of the material (the load at which is yields), but do not affect the stiffness (elastic deformation in response to load).

Euler Buckling

FIGS. 5A-5C show simulation screenshots (L to R) of (A) a 10×10×10 cube in uniaxial compression with element displacement contours, (B) closeup of 2×2×2 area, and (C) axial force contours. While the global behavior, and even nominal beam forces relative to external loading, can be calculated analytically, it is helpful to investigate the behavior of the joint numerically. In FIGS. 6A-6D, the joint CAD and FEA simulations are shown. Based on this design, failure criteria can be evaluated in relation to beam failure criteria, and can be adjusted to achieve an acceptable factor of safety to ensure proper lattice behavior. FIGS. 6A-6D show in steps a joint design and simulation. Stress concentrations can be seen in the corner.

Production

The part is designed such that it can be molded with a two-part tool (a cavity and a core with additional moving parts). This reduces the cost of the tooling significantly. The gate layout and resulting knit line patterns are shown in FIGS. 7A-7C. A single gate, and its relative location, was selected due to the potential for fiber alignment along the top and bottom beams, while maintaining relative symmetry of the gate and major beam knit lines on opposing beams. It can be seen that there is a non-trivial difference in the resulting mechanical properties of each beam as a function of fiber alignment and content based on each beam position relative to the gate. FIGS. 7A-7C show an example of a two-part mold tooling cavity and core (A-B) and mold flow analysis (C).

Results

Figure 8A:
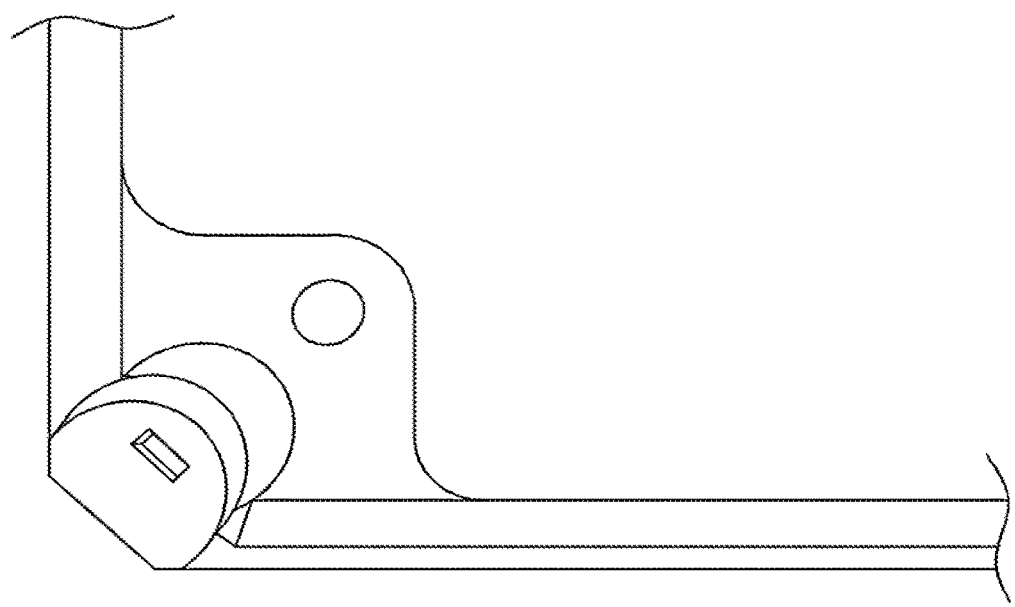
Figure 8B:
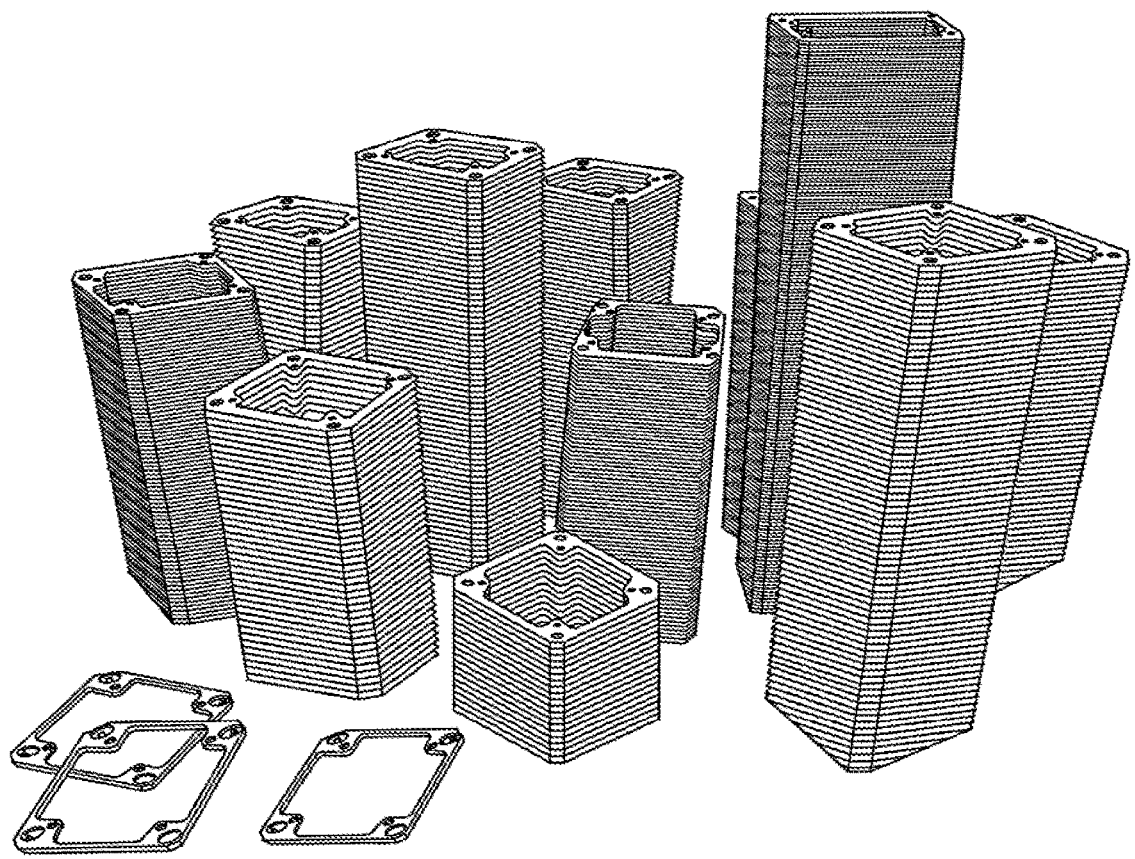

FIGS. 8A-8B show molded parts. (A) Fibers are clearly visible within a beam as well as around holes and corners. (B) Batch production of parts. FIGS. 9A-9B show a 10×10×10 voxel cube consists of 1,000 voxels made up of 6,000 molded parts in (A) corner view and (B) side view.

Characterization

After parts are produced, they are experimentally teste to validate specific aspects critical to assumptions about continuum behavior. FIG. 10: Tensile testing of voxel to voxel connection. FIGS. 11A-11B show characterization of strut modulus based on relative location on part. FIGS. 12A-12C show 1×1×1, 2×2×2, and 3×3×3 compression testing. The bottom row highlights initial beam failure locations. FIGS. 13A-13B show Testing results. (A) Load vs displacement for range of specimens, (B) Comparison of analytical and numerical predictions with experimental results showing convergence with increasing voxel count.

Several descriptions and illustrations have been presented to aid in understanding the present invention. One with skill in the art will realize that numerous changes and variations may be made without departing from the spirit of the invention. Each of these changes and variations is within the scope of the present invention.

REFERENCES

4. L. Gibson, M. Ashby, "Cellular Solids: Structure & Properties", Cambridge Press, 1999.
5. T. Schaedler, et al, "Ultralight Metallic Microlattices", Science, 2011.
6. X. Zheng, et al, "Ultralight, ultrastiff mechanical metamaterials", Science, 2014.
7. K. Cheung and N. Gershenfeld, "Reversibly Assembled Cellular Composite Materials" Science, 2013
8. C. Gregg, et al, "Ultra-Light and Scalable Composite Lattice Materials", Adv. Eng. Mat, 2018
9. B. Jenett, et al, "Digital Morphing Wing: Active Wing Shaping Concept Using Composite Lattice-Based Cellular Structures", Soft Robotics, 2016.
10. N. Cramer, et al, "Elastic Shape Morphing of Ultralight Structures by Programmable Assembly", Smart Materials and Structures, 2019.
11. B. Jenett, et al, "Meso-Scale Digital Material: Modular, Reconfigurable, Lattice-Based Structures", ASME MSEC, 2016.
12. B. Jenett, et al, "Material-Robot System for Assembly of Discrete Cellular Structures", IEEE Robotics and Automation Letters, 2019.

We claim:

1. A cuboctahedral lattice structure comprising:
a plurality of cuboctahedron cells faces molded using a two-piece mold, each face composed of a plurality of beams that form a substantially closed polygon substantially in a single plane to form an empty area in said plane encircled by the plurality of beams, each said face comprising joints in the single plane offset from polygon corners;
the cuboctahedron cell faces assembled into cuboctahedron cell voxels; and
a sufficient number of said cuboctahedron cell voxels attached according to a chosen lattice pitch to form a cellular lattice structure by connection of said voxels together through attachment of corner-offset joints in adjacent voxels.

2. The structure of claim 1 wherein the cuboctahedron cells faces and voxels are attached using a method chosen from the group consisting of welding, gluing, bolting and riveting.

3. The structure of claim 1 wherein the molding is injection molding.

4. The structure of claim 1, wherein the cuboctahedron cell voxels are glass fiber, carbon fiber or reinforced polymer.

5. The structure of claim 1, wherein the lattice pitch is 75 mm.

6. The structure of claim 1, wherein each of the plurality of cuboctahedron cell faces is square in shape, and has two types of joints at each vertex: a voxel-corner joint and a neighbor joint.

7. The structure of claim 6, wherein the voxel corner joint is at a 45-degree angle out of plane from the square face, and is used to join square faces together to form a full voxel.

8. The structure of claim 7, wherein each neighbor joint is offset from the voxel corner and is in a plane with the square face, and is used to join a single voxel to another voxel.

9. A cuboctahedral lattice structure comprising:
a plurality of cuboctahedron cells faces injection molded using a two-piece injection mold, each face composed of a plurality of beams that form a substantially closed polygon substantially in a single plane to form an empty area in said plane encircled by the plurality of beams, each said face comprising joints in the single plane offset from polygon corners;
the cuboctahedron cell faces assembled into cuboctahedron cell voxels by gluing, welding or riveting; and
a sufficient number of said cuboctahedron cell voxels attached according to a chosen lattice pitch to form a cellular lattice structure by connection of said voxels together through attachment of corner-offset joints in adjacent voxels.

10. The structure of claim 9, wherein the cuboctahedron cell voxels are glass fiber, carbon fiber or reinforced polymer.

11. The structure of claim 9, wherein the lattice pitch is 75 mm.

12. The structure of claim 9, wherein each of the plurality of cuboctahedron cell faces is square in shape, and has two types of joints at each vertex: a voxel-corner joint and a neighbor joint.

13. The structure of claim 12, wherein the voxel corner joint is at a 45-degree angle out of plane from the square face, and is used to join square faces together to form a full voxel.

14. The structure of claim 13, wherein each neighbor joint is offset from the voxel corner and is in a plane with the square face, and is used to join a single voxel to another voxel.

15. The structure of claim 9, wherein the injection molding uses a two-part mold tooling comprising a mold cavity and mold core.

16. A lattice structure comprising:
a plurality of molded cell faces, each face composed of a plurality of beams that form a substantially closed polygon substantially in a single plane to form an empty area in said plane encircled by the plurality of beams, each said face comprising joints in the single plane offset from polygon corners;
the cell faces assembled into cell voxels; and
a sufficient number of said voxels attached to form a cellular lattice structure by connection of said voxels together through attachment of corner-offset joints in adjacent voxels.

* * * * *